US006819344B2

(12) United States Patent
Robbins

(10) Patent No.: US 6,819,344 B2
(45) Date of Patent: Nov. 16, 2004

(54) VISUALIZATION OF MULTI-DIMENSIONAL DATA HAVING AN UNBOUNDED DIMENSION

(75) Inventor: Daniel C. Robbins, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 547 days.

(21) Appl. No.: 09/804,284

(22) Filed: Mar. 12, 2001

(65) Prior Publication Data

US 2002/0126121 A1 Sep. 12, 2002

(51) Int. Cl.[7] .............................. G09G 5/00; G06T 11/20
(52) U.S. Cl. ....................... 345/848; 345/441; 345/713; 345/734; 345/735; 345/736; 345/765; 345/771; 345/850; 345/852; 345/853
(58) Field of Search ................................. 365/771, 765, 365/734–738, 712, 713, 744–747, 721, 441; 345/848, 852, 853

(56) References Cited

U.S. PATENT DOCUMENTS

| | | | | |
|---|---|---|---|---|
| 4,893,286 A | * | 1/1990 | Cobb | ........................... 367/87 |
| 5,449,330 A | * | 9/1995 | Paulsen | ....................... 447/107 |
| 6,154,212 A | * | 11/2000 | Eick et al. | .................... 345/848 |
| 6,628,313 B1 | * | 9/2003 | Minakuchi et al. | .......... 345/853 |
| 6,664,986 B1 | * | 12/2003 | Kopelman et al. | ........... 345/849 |
| 2001/0028369 A1 | * | 10/2001 | Gallo et al. | .................. 345/848 |

OTHER PUBLICATIONS

Johnson, R.R.; "Visualization of Multi–Dimensional Data with Vector–Fusion", Proceedings Visualization 2000. VIS 2000, 2000, p. 297–302, 570.

Kennedy, J., et al.; Interfaces to Databases (IDS–3) Proceedings of the 3rd International Workshop on Interfaces to Databases, Jul. 1996, p. 1–12.

Feiner, S., et al.; "Visualizing n–Dimensional virtual Worlds with n–Vision", ACM, 1990, p. 37–38.

Carlis, J.V., et al.; "Interactive Visualization of Serial Periodic Data", Proceedings of UIST'98: The 11th Annual Symposium on User Interface Software and Technology, 1998, p. 1–10.

* cited by examiner

Primary Examiner—Ba Huynh
Assistant Examiner—Truc T Chuong
(74) Attorney, Agent, or Firm—Amin & Turocy, LLP

(57) ABSTRACT

An interactive visualization of stored data includes a representation of a three-dimensional generally helical path extending between spaced apart ends of the path. Selected parts of the stored data are mapped to corresponding parts of the helical path to facilitate visualization of the stored data. The stored data may include an unbounded dimension (e.g., time) that is mapped along the helical path. One or more user interface elements may be associated with the helical path to effect display of additional information associated with a selected part of the path.

20 Claims, 22 Drawing Sheets

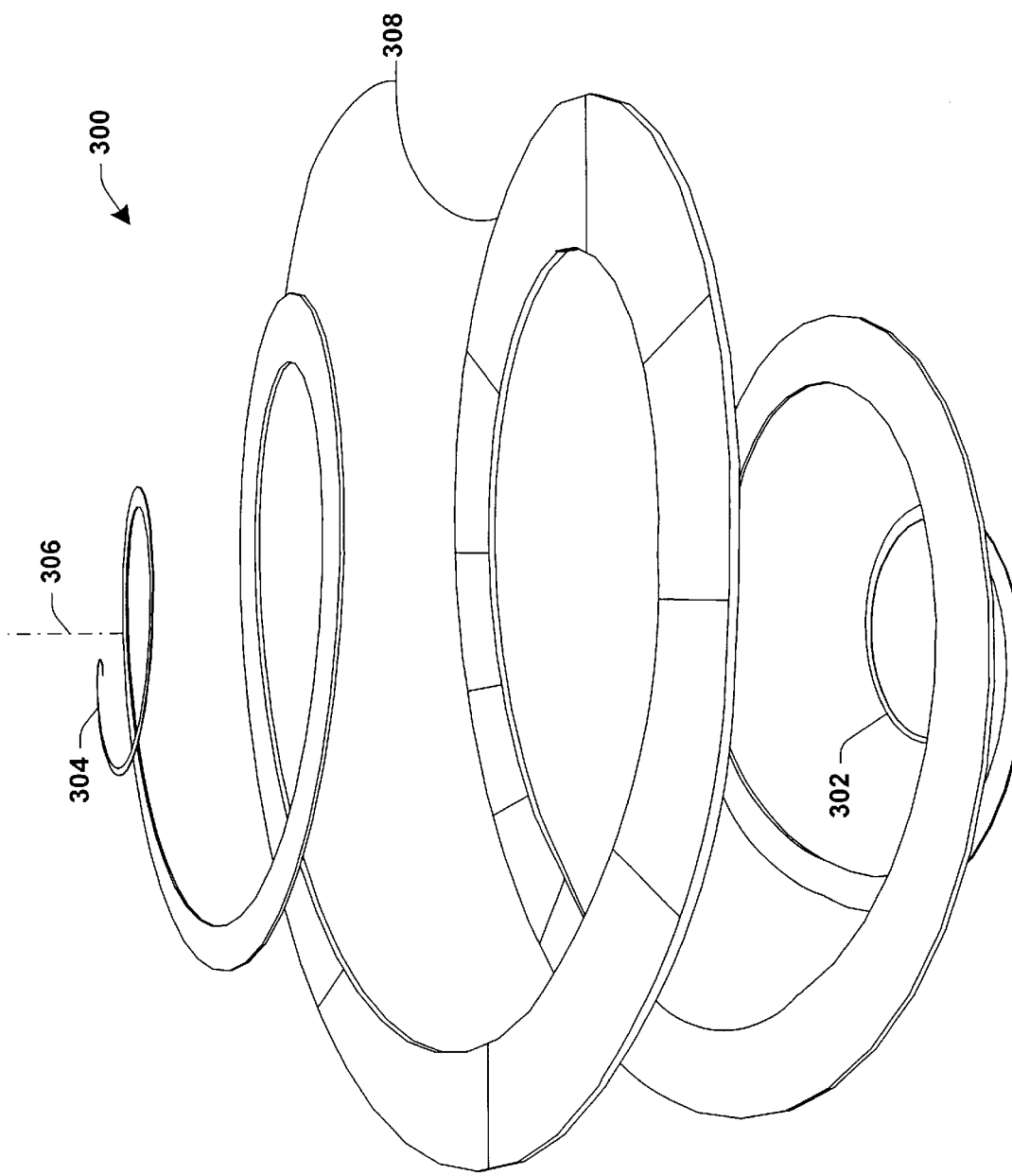

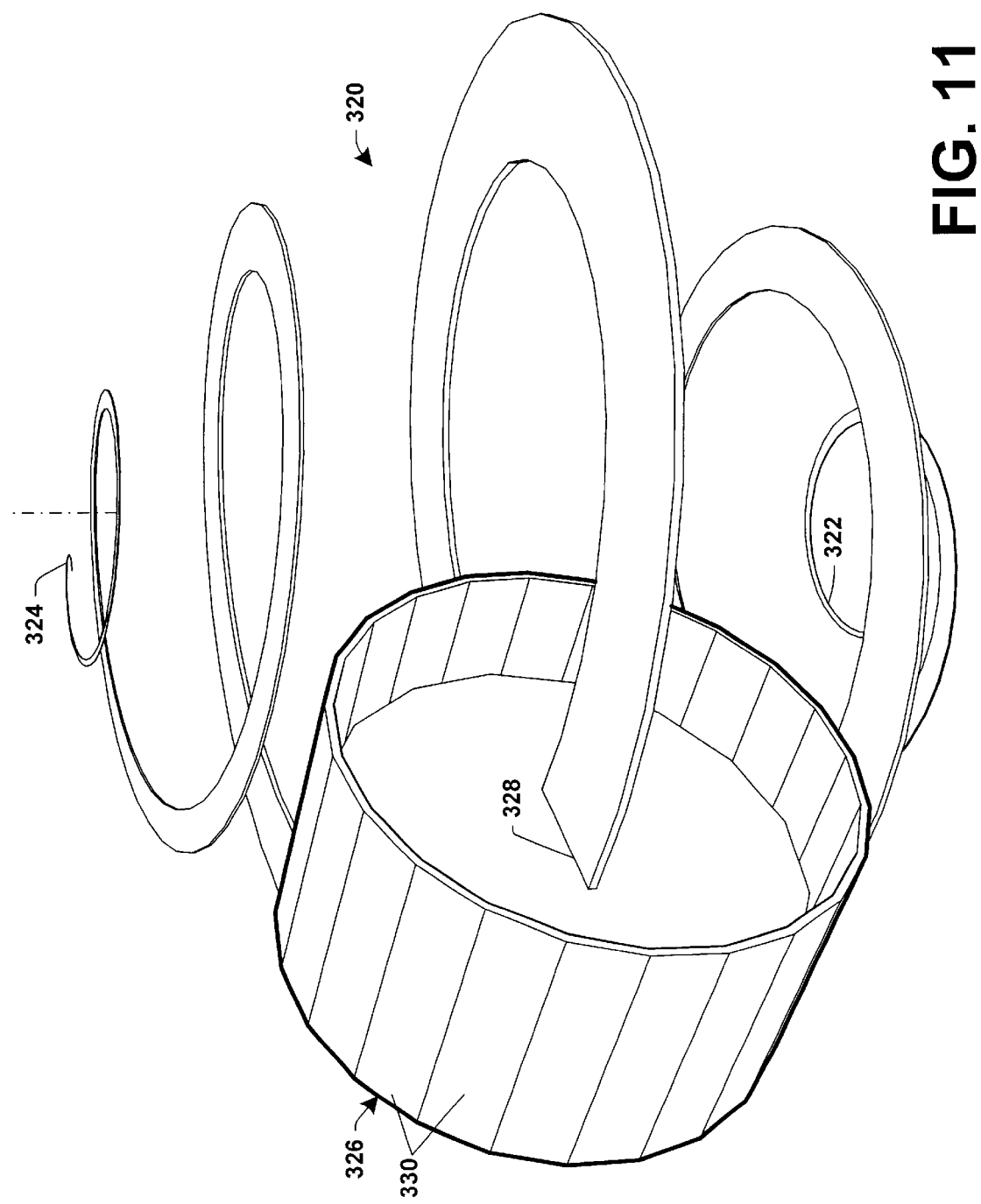

VISUALIZATION OF MULTI-DIMENSIONAL DATA HAVING AN UNBOUNDED DIMENSION

TECHNICAL FIELD

The present invention relates to computer programming and, more particularly, to a system and method to facilitate visualization of multi-dimensional data.

BACKGROUND

A goal of information visualization is to use computer graphics to utilize human perceptual processes in organizing and understanding data, such as may pertain to physical phenomena, including semantic domains. Informational elements that are to be visualized often have only semantic properties with no inherent spatial form that may be employed to create a visual representation. Accordingly, spatial ordering used in a display should be implemented as part of the visualization process. Viewed in this way, information visualization generally requires three components: data organization, visual spatial representations of the data organization, as well as display and interaction elements.

Various information visualization techniques have been implemented to display different types of data in an organized and logical manner. In general, information visualization maps data sets into visual media to facilitate analysis of the data and/or to communicate information about such data. Oftentimes, the data being represented has one or more unbounded dimensions, which has no natural beginning or end. A common example of an unbounded element is time, such as may be displayed in connection with a timeline (e.g., in a linear manner). A graphical visualization of a timeline, however, typically is cropped by the edges of the display.

In order to display a greater portion of time-based data, spacing between portions of the displayed representation may be adjusted, such that a region of interest is shown in greater detail than regions outside the region of interest. One example of such a technique is to construct the visualization according to the notion of a "fisheye" view of the data. In a fisheye visualization technique, side portions may be progressively more densely packed further away from the region of interest. As a result, a fisheye technique for visualizing data does not facilitate visualization of periodic data nor does it help view relationships between spaced apart items of data.

A two-dimensional spiral visualization attempts to overcome some of the shortcomings of the linear visualization techniques. When the period of a spiral is appropriately chosen, for example, a spiral visualization facilitates viewing periodic data, including periodic patterns associated with the data. Data that occurs in time following a pattern is easily viewable with a spiral representation. Spirals also have been utilized to arrange a list of items into a compact space and for showing correspondence between different granularities of information. Typically, a spiral representation of linear information is represented as a flat spiral, in which different values of the data are associated with different segments along the spiral. An advantage of the spiral visualization of linear data is its compactness and scalability. However, such a visualization tends to create false impressions concerning the duration or level of importance of different data. For example, segments of data near the periphery of a spiral usually have a greater arc length than the segments near the center even though they do not actually have a longer duration in time.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method to facilitate visualization of time-based data, such as periodic time-based data. According to one aspect of the present invention, the data is graphically represented as a three-dimensional helical path. The helical path has a central axis from which at least a portion of a helical sidewall is radially spaced. The helical sidewall has a plurality of adjoining segments that form the helical sidewall. Selected data is mapped to each segment.

In order to provide a substantially unbounded representation of the time-based data (e.g., traversing into both the past and future), the helical path may include a compressed spiral at one or both of its ends that approximately fits into a conical envelope. In this configuration, a central portion of helical sidewall has a larger diameter relative to the conical spiral portion(s).

A suitable user interface may be provided to navigate the helical path, such as to obtain more detailed information about data associated with a particular part of the helical path. By way of example, each segment (or point) along the helical path may be associated with a different point in time. In order to obtain more detailed information about a particular point in time, the user interface may be employed to select one or more segments. Because the helical representation, in accordance with an aspect of the present invention, is graphically represented as having three dimensions, it is possible that one portion of the helical path may occlude another portion. Therefore, viewing control and zooming components may be provided to manipulate and/or visualize data associated with a selected portion of the helical path so as to provide an unoccluded representation of a selected portion of the visualization.

Depending on the type of data being represented by the helical path, certain dimensions may be represented as being unbounded dimensions and others as bounded dimensions. Accordingly, various techniques may be employed, in accordance with an aspect of the present invention, to embed related data in the segments of the three-dimensional graphical representation. The different axes of data thus may be accessed via the user interface.

By way of further illustration, a three-dimensional helical representation may be employed, in accordance with an aspect of the present invention, to implement an Electronic Program Guide (EPG). A main path of a generally helical representation, for example, corresponds to the passage of time. Other television programming characteristics (e.g., channels, program titles, duration, descriptive information, etc.) may be implemented as other programming data embedded within corresponding segments of the helical path. The particular mapping of programming data to the helical representation may be user configurable and/or vary according to the particular programming characteristics being implemented in the EPG.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 10 is another example of a graphical representation of a three-dimensional helical path that may be employed to visualize data in accordance with the present invention;

FIG. 11 is another example of a helical path implemented in conjunction with an interface element that may be employed to visualize data in accordance with the present invention;

DESCRIPTION OF THE INVENTION

The present invention provides a system and method to facilitate visualization of multi-dimensional data having at least one unbounded dimension. The data is selectively mapped into a three-dimensional helical path having a central axis from which a helical sidewall is radially spaced. An associated user interface may be provided for selecting a segment of interest and, in turn, visualizing one or more other dimensions of data associated with the selected segment.

Figure 1:
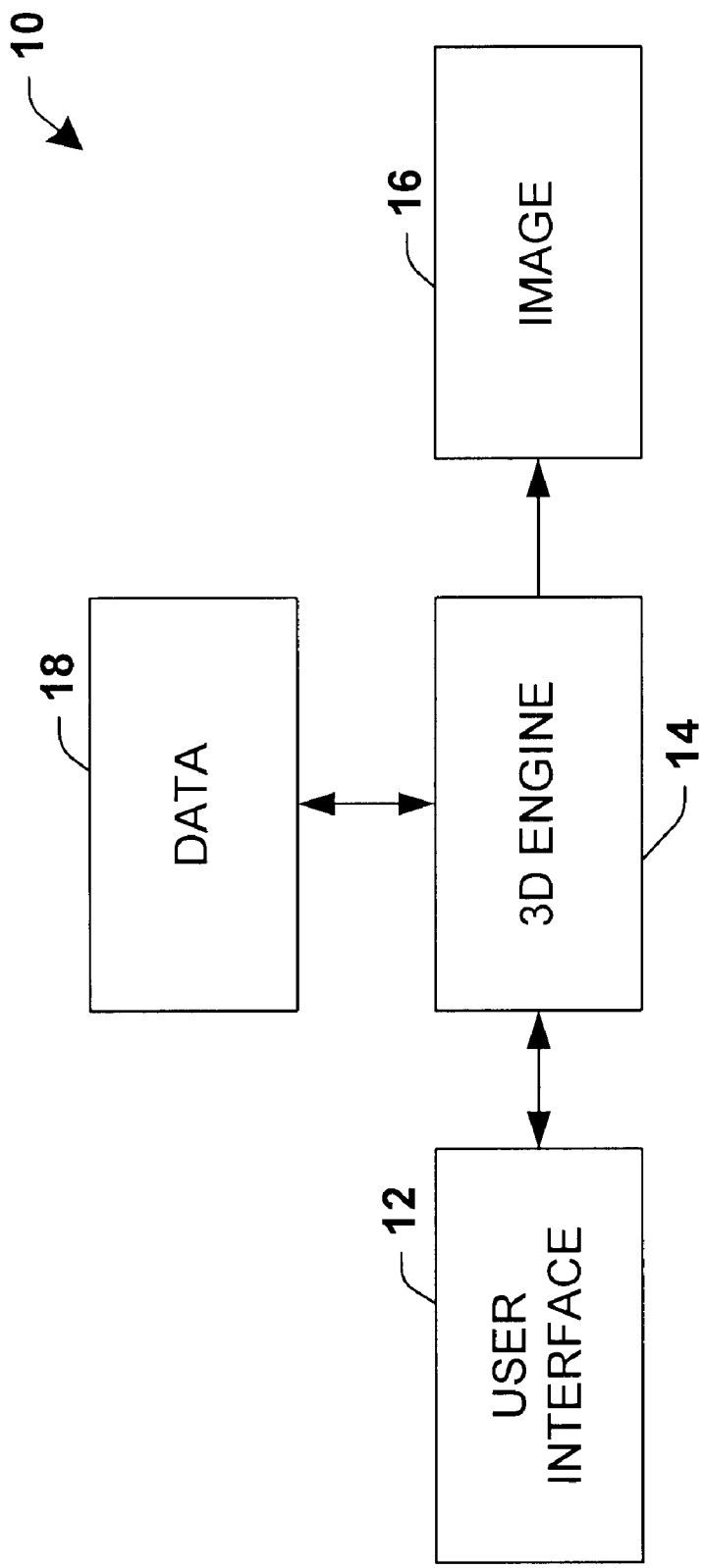
FIG. 1 is simplified block diagram of a system that may be employed to visualize data in accordance with the present invention.

FIG. 1 is a simplified block diagram of a system 10 that may be utilized to visualize multi-dimensional data in accordance with an aspect of the present invention. The system 10 includes a user interface 12 that is operatively coupled to a graphical engine 14 for controlling a graphical display of an associated three-dimensional image 16. The image 16 provides a two-dimensional representation of a three-dimensional spiral and/or helical path having features programmed to interactively visualize stored multi-dimensional data 18. The data 18 may have one or more substantially unbounded dimensions (see, e.g., FIGS. 3–21). For example, an unbounded dimension of the data 18 may be mapped to a generally unbounded part of the image 16.

For purposes of simplicity of explanation, various visualizations discussed herein and claimed are described as having a helical path, although it will be understood and appreciated that, unless otherwise specified, each such path may have a generally circular cylindrical, conical, and/or spiral configuration. Additionally, a user may choose to expand sections of the path to show finer detail. This expansion may be such that a particular section of the path may be drawn generally parallel to the horizontal axis of the display monitor. To accommodate this extreme expansion, regions adjoining the expanded section may be seen as substantially parallel to a vertical axis of the display monitor.

In accordance with an aspect of the present invention, the graphical engine 14 is programmed and/or configured to dynamically control the appearance of the image 16, including which aspects of information are being displayed, in response to user selections via the user interface 12. For example, the graphical engine 14 may animate one or more features of the image 16 to facilitate further visualization of other dimensions of information associated with a selected portion of the image 16, such as corresponding to one or more dimensions of the stored data 18.

The data 18 includes a plurality of records or dimensions of hierarchal data indicative of different aspects of information. One particular type of data that may be implemented in accordance with an aspect of the present invention relates to audio and/or visual programming data, with the visualization of such data providing a corresponding interactive Electronic Program Guide (EPG). For example, an audio and/or visual programming data record for each program may include fields identifying a title, description, duration, rating, stars or hosts, broadcast date and time, genre or category of program, etc. The various fields or other associated information may be organized according to user interface 12 and, in turn, be mapped into the visualization accordingly. The user interface 12 may, in turn, be employed to sort through and visualize selected aspects of the stored data 18, as represented by the image 16, through animation performed by the graphical engine 14 relative to the data.

Figure 2:
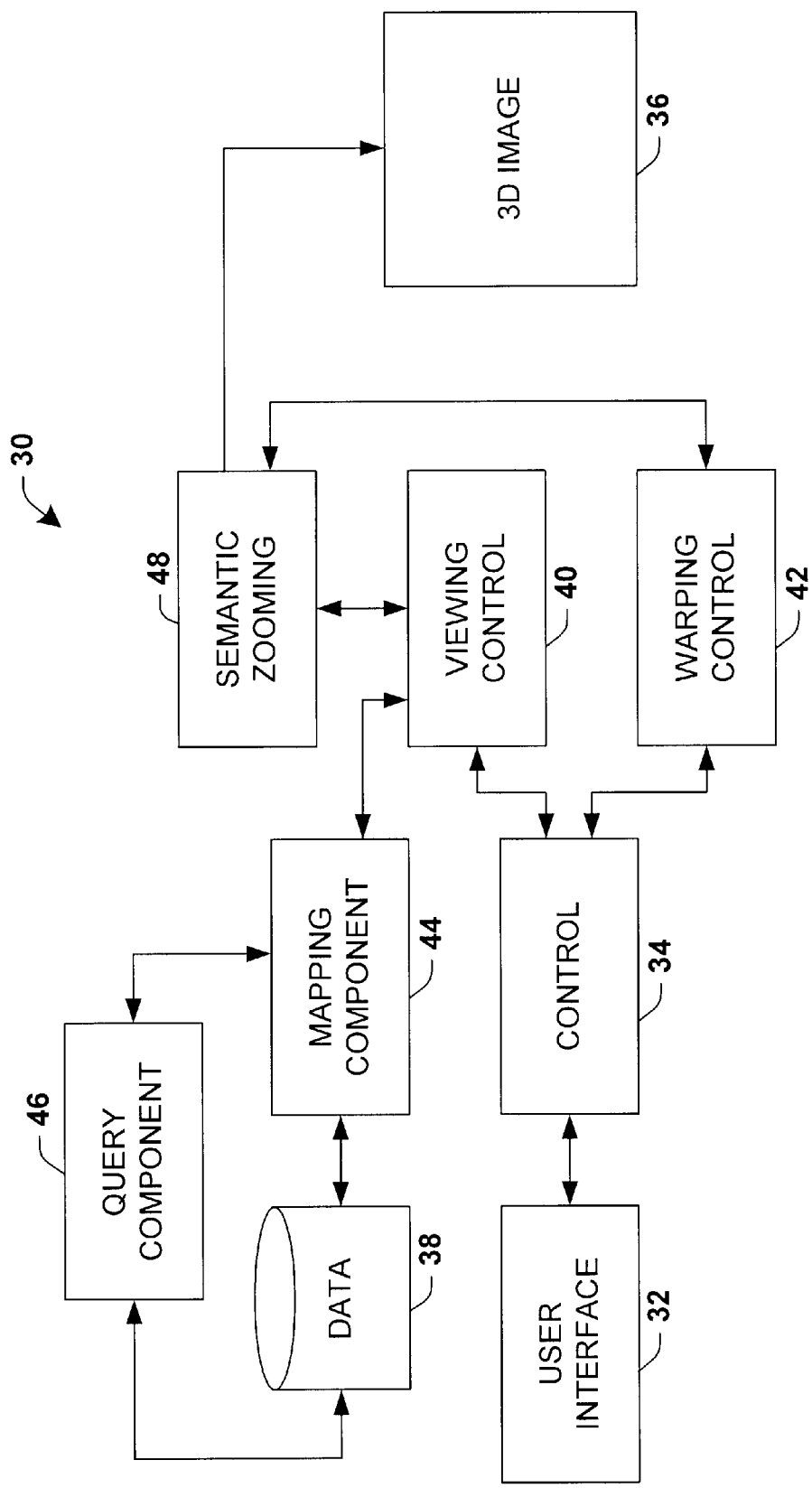
FIG. 2 is a functional block diagram of a system for visualizing data in accordance with the present invention.

FIG. 2 is another example of a system 30 for visualizing data in accordance with an aspect of the present invention. The system 30 includes a user interface component 32 coupled to a control module 34 that receives instructions from the user interface 32 and controls warping and viewing of an image 36 that is created to visualize stored data 38. More particularly, the control module 34 is coupled to a viewing control function 40 and a warping control function 42 for respectively controlling viewing and warping of the displayed image 36. The viewing control 40 determines which part of the image 36 (e.g., dimension of the stored data) is to be displayed as a center of interest for user interaction based on the information provided from the control module 34.

The warping control 42 implements a visualization technique presenting one or more selected dimensions of the stored data 38 as part of the image. The warping control 42 may manipulate the image 36, such as through animation, to focus on a desired center of interest. Other graphical display elements also may be mapped to the center of interest to visualize other information associated with the center of interest (e.g., other related dimensions of the stored data).

By way of example, the warping control 42 may stretch a desired segment of the image 36 using a well-known fish-eye technique, such that the selected segment is enlarged and not occluded. Alternatively, a virtual camera may be positioned to look at a desired part of the image 36. The warping control 42, in turn, may further animate the image to view a selected portion that in a line of sight of the camera. Still another example of visualization is to unfold the helical path of the image 36 into a pair of side-by-side helical structures, such that each portion exhibits no occlusion. In addition, the warping control 42 may enlarge part of the displayed image 36 (e.g., increase the width of the helical path) so that additional information may be shown in the image, such as written directly on one or more segments of the helical path within a center of interest. Additionally, a separate, zoomed-in inset section (not shown) of the helical path may be simultaneously shown alongside or on top of the overall three-dimensional structure. The overall representation functions as a map for visual navigation for the inset view. The foregoing and other examples of three-dimensional data visualizations that may be implemented in accordance with an aspect of the present invention are shown and described below with respect to FIGS. 3–21.

Referring back to FIG. 2, the viewing control 40 is operatively associated with a mapping component 44, which is coupled to the data 38 and a query component 46. The mapping component 44 and the query component 46 cooperate to select which item(s) of stored information are to be associated with the image 36. The query component 46, for example, locates data based on the user inputs received via the user interface. The query component 46 retrieves corresponding data and provides such data to the mapping component 44. The mapping component 44 is programmed to control what data is to be mapped to which part of the image 36. The particular mapping of data to the image 36 may vary according to the particular geometry of the image. The mapping component 44 provides mapping data to the viewing control 40.

The viewing control 40 and the warping control 42 also are operatively associated with a semantic zooming component 48, which operates to provide a more informative interface based on information provided by the viewing and warping controls. The semantic zooming component 48 provides graphical data that controls the appearance of the image 36, such as shown and described herein, to visualize selected aspects of as part of an interactive visualization 36 of the stored data 38.

The semantic zooming component, for example, adapts the displayed information to the scale the associated visualization 36, such that a user can zoom in to examine details and individual values of data associated with a selected part of the image. The semantic zooming component 48 employs an algorithm to adjust the presentation in a desired manner, such as are common in existing algorithm animation and program visualization systems, in order to minimize visual clutter while optimizing the amount and kind of displayed information. This may include, for example, scaling the image and modifying the style of the image according to the type of data being displayed. Those skilled in the art will understand and appreciate various other features that may be implemented in conjunction with the semantic zooming component 48 to provide a desired interactive visualization of the stored data 38.

Figure 3:
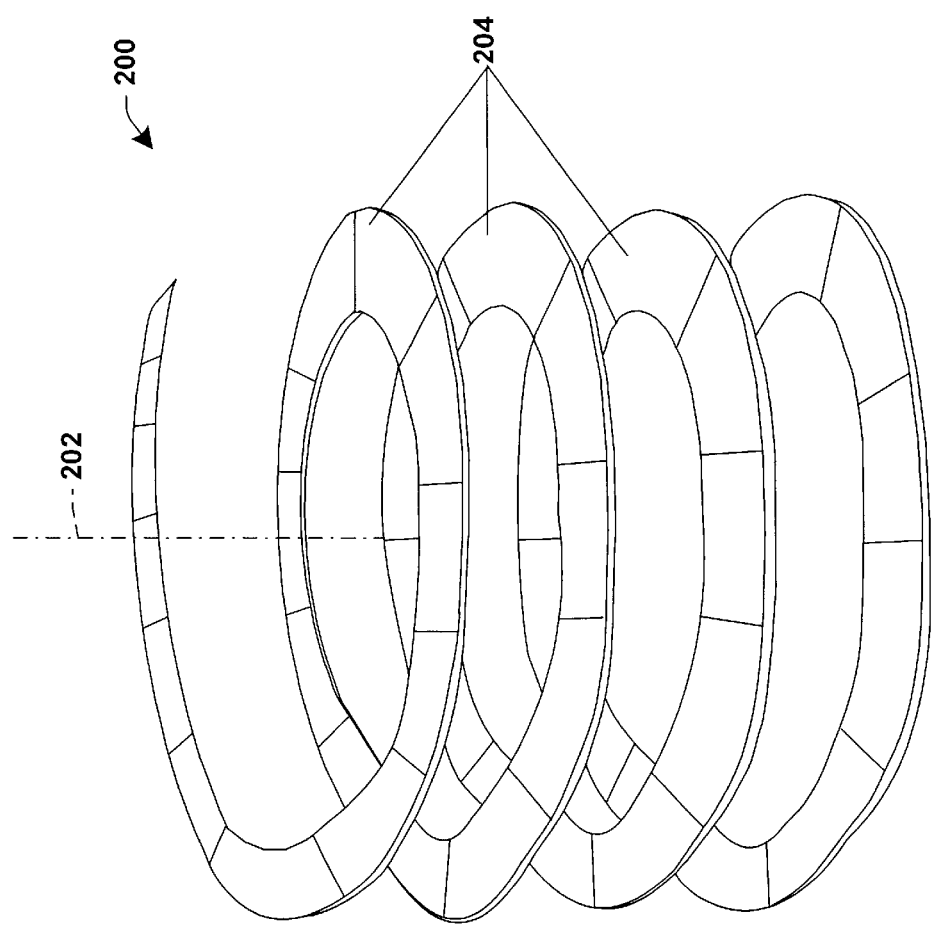
FIG. 3 is an example of a graphical representation of a three-dimensional helical path that may be employed to visualize data in accordance with the present invention.

FIG. 3 is an example of a two-dimensional representation of a three-dimensional helical path 200 in accordance with an aspect of the present invention. The helical path 200 is in a generally cylindrical configuration having a central axis 202 extending through the center of the helical path. While an axis 202 is illustrated in FIG. 3 (as well as in subsequent figures) to facilitate describing geometrical features, it is to be understood that an axis typically would not be provided as part of the visualization. The helical representation 200 is divided into a plurality of segments 204 all having a substantially equal arc length. This is in contrast to a traditional spiral representation in which segments near an outside of the spiral appear to have a larger length or longer duration than the segments near the center. As a result, the graphical representation according to the present invention reduces the likelihood that false impressions of importance will be given to different segments of the helical path. Segments of equal duration thus will essentially subtend equal regions on the screen.

Figure 4:
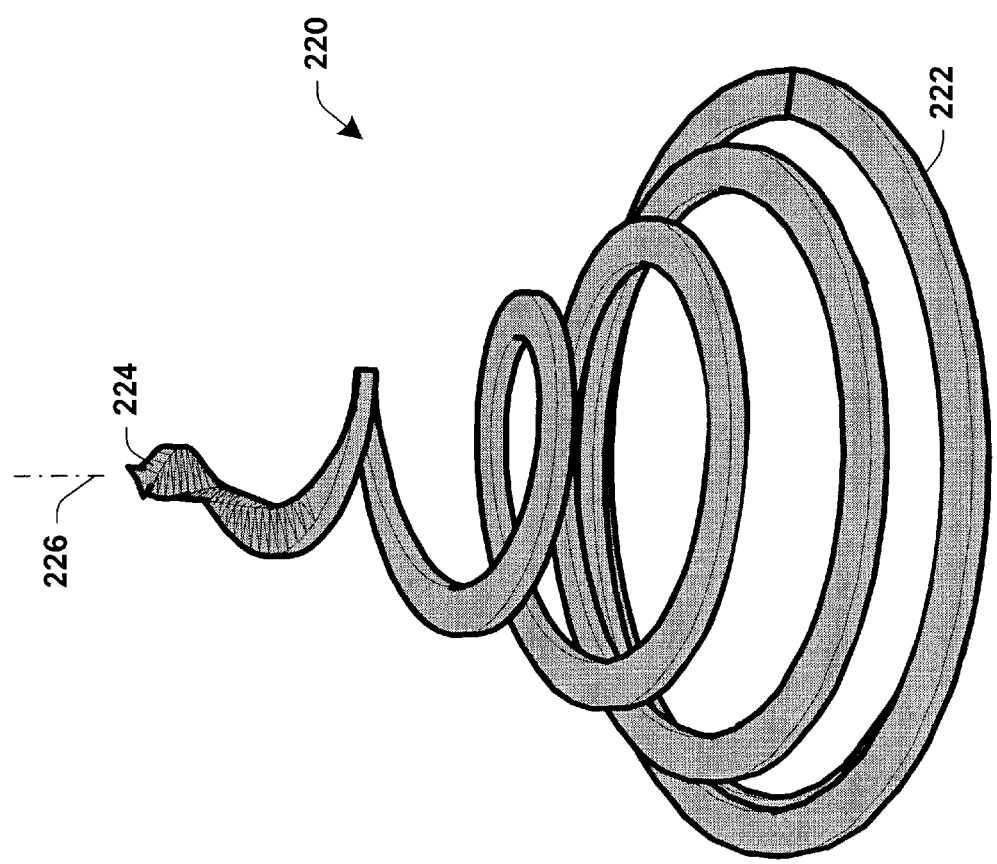
FIG. 4 is an example of a graphical representation of a three-dimensional spiral having one unbounded end that may be employed to visualize data in accordance with the present invention.

FIG. 4 is another example of a two-dimensional representation of a three-dimensional helical path 220 in accordance with an aspect of the present invention. The helical path 220 incorporates features advantageous to both traditional two-dimensional spirals and the three-dimensional helical path 200 shown in FIG. 3. In particular, the representation 220 appears as a three-dimensional helical path having a larger diameter at one end 222 than at its opposite end 224. The helical path 220 extends axially around a central axis 226 between its spaced apart ends 222 and 224. The end 224 provides an unbounded representation in one direction as the data is scaled down to eventually reach an infinitely small size.

By way of example, the larger end 222 may correspond to data associated with center of interest, such as a present time period. As we travel along the helical path towards the end 224, such movement may correspond to traversing along data associated with the past or the future relative to the data associated with the end 222. Items that are at the center of interest are displayed larger than those of less importance. A smooth transition is used between the different scales of representation, thus resulting in a three-dimensional spiral or "pinched helix," as shown in FIG. 4.

Figure 5:
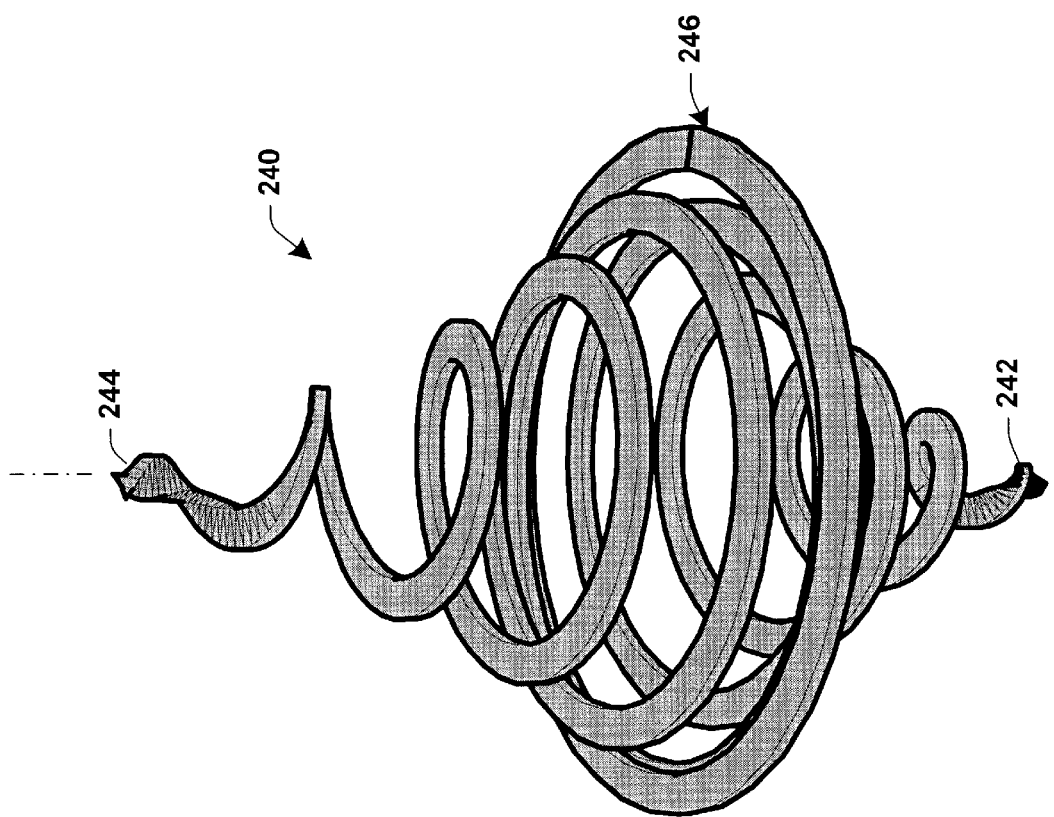
FIG. 5 is an example of a graphical representation of a three-dimensional spiral having a pair of unbounded ends that may be employed to visualize data in accordance with the present invention.

FIG. 5 is another two-dimensional representation of a three-dimensional helical path 240 having opposed ends 242 and 244, which correspond to unbounded representations of data in both directions. This visualization 240 implicitly assumes a center of interest 246 at a location between the ends 242 and 244. It is to be understood and appreciated by those skilled in the art that a user may employ a user interface (e.g., the user interface 32 of FIG. 2) to navigate along the helical path 240, which may in turn implement animation and a dynamic geometry to adjust the center of interest for the user accordingly.

There are generally two visual approaches in which this may be accomplished. In one approach, the center of interest 246 stays rooted to the center of the display. With this method, as the user changes the center of interest 246, data displayed on the three-dimensional spiral 240 traverses around the spiral opposite the direction of the change in the center of interest. The overall geometry of the three-dimensional spiral 240 is unaffected. In the second approach, the visual location of the center-of-interest 246 moves up and down. Accordingly, the geometry of the three-dimensional spiral 240 warps to move the expanded region towards the center-of-interest 246.

Figure 6:
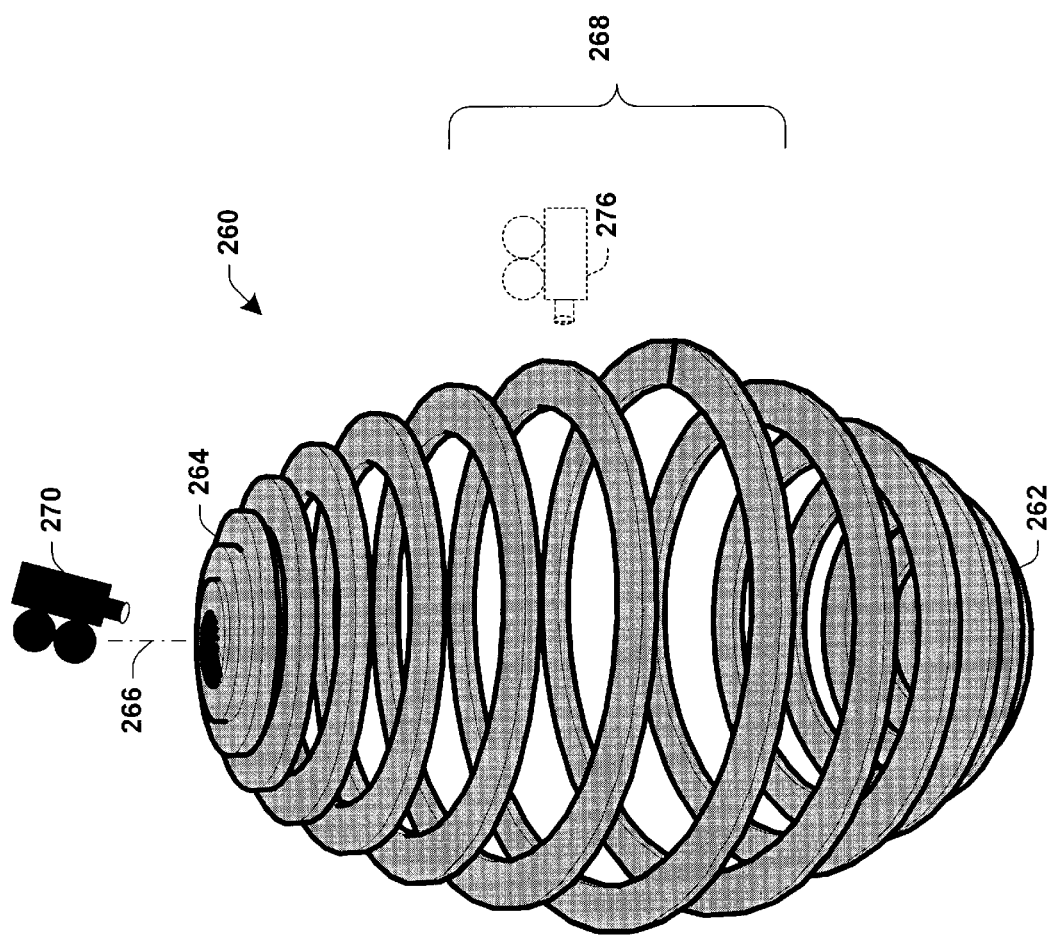
FIG. 6 is an example of a graphical representation of a three-dimensional helical path that may be employed to visualize data in accordance with the present invention.

FIG. 6 illustrates another two-dimensional representation of a three-dimensional helical path 260 that may be employed to visualize multi-dimensional data in accordance with an aspect of the present invention. The helical path 260 includes spaced apart ends 262 and 264 scaled to provide unbounded representations at the respective ends. The helical path 260 generally surrounds a central axis 266 that extends through the ends 262 and 264. In addition, an elongated central region 268 of the representation has been expanded into the shape of a generally cylindrical helix similar to the helical path 200 shown and described with respect to FIG. 3. For example, a user may employ a user interface to select appropriate warping and scaling to modify a displayed representation (e.g., the path 240 of FIG. 5) to implement the central expansion 268 or such expansion may be implemented as a standard part of the visualization 260. The general purpose of this shape is to allow a user to view a region of data without any warping among that region. Because of this configuration, warping at the boundaries of the center-of-interest region is exaggerated more than in FIG. 5.

The helical visualization 260 further includes a user interface element represented as a virtual camera 270. The virtual camera 270 provides a graphical interface through which a user to select a line of sight relative to the visualization 260, such as to view data associated with a selected part of the visualization.

Those skilled in the art will understand and appreciate various modifications of such three-dimensional helical and/or spiral visualizations that may be implemented in accordance with an aspect of the present invention for visualizing time-based data or other data having at least one substantially unbounded dimension. With the data appropriately mapped into corresponding locations along the three-dimensional representation, various techniques may be utilized to further animate the visualization and present to the user with a visual indication of additional details in connection with a user-controllable viewpoint.

Figure 7:
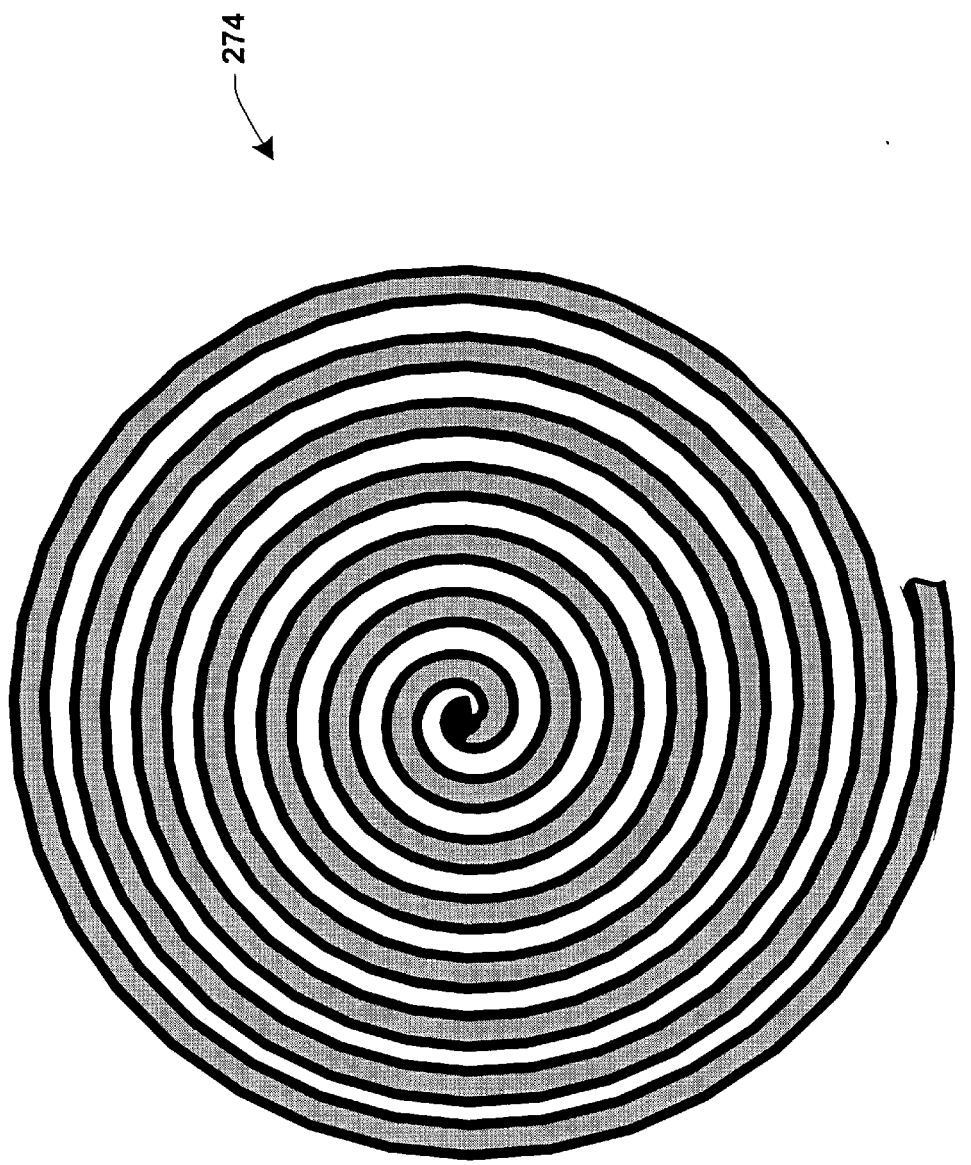
FIG. 7 is top view of the graphical representation of FIG. 6 in accordance with the present invention.

By way of example, FIG. 7 demonstrates a top-down or bottom-up visualization 274 of a three-dimensional helical path in which the virtual camera 270 (FIG. 6) has been positioned to obtain a substantially axial view of the helical visualization 260 (FIG. 6), with the camera looking substantially axially relative the helical path. As a result, the portion of the helical path being viewed by the virtual camera is elided, as shown in FIG. 7. The visualization of FIG. 7 facilitates visualization of the periodic relationships between the data being visualized in the three-dimensional helical path may be viewed with reduced occlusion between visible segments. That is, the visualization 274 may be derived from the three-dimensional helical path 260, such as by animating the visualization to provide a two-dimensional representation of a selected portion of the three-dimensional image. Animating a camera, for example, provides a smooth transition for the user and increases the perceptual understanding of the relationship between the two configurations.

Referring back to FIG. 6, for example, a user may position the virtual camera 270 via a suitable user input device (e.g., a mouse, keyboard, remote control, etc.) to select a desired viewpoint or line of sight, such as a segment along the helical path. A phantom view of a camera, indicated at 276, illustrates an example of employing the camera to obtain an alternative viewpoint of the visualization 260. The selection, in turn, animates the three-dimensional visualization 260 into a corresponding two-dimensional visualization 274 of the selected portion of the three-dimensional helical path, such as based on the line of sight of the virtual camera 270, 276, such as shown in FIG. 7.

Figure 9:
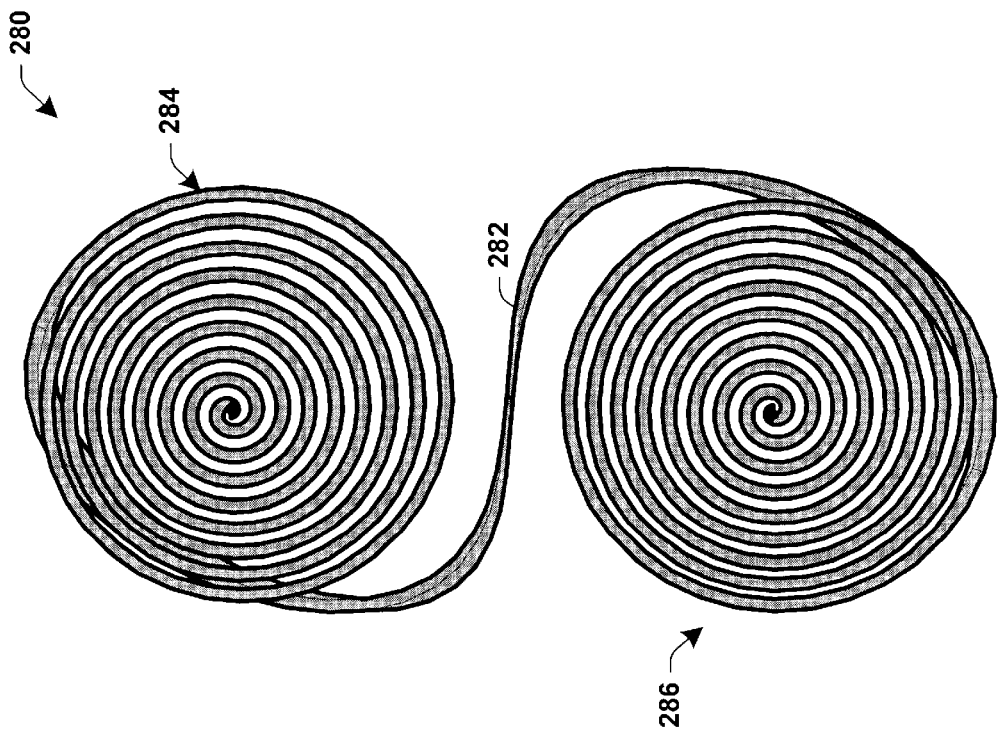
FIG. 9 is a view of the helical path of FIG. 8 in an unfolded condition.
Figure 8:
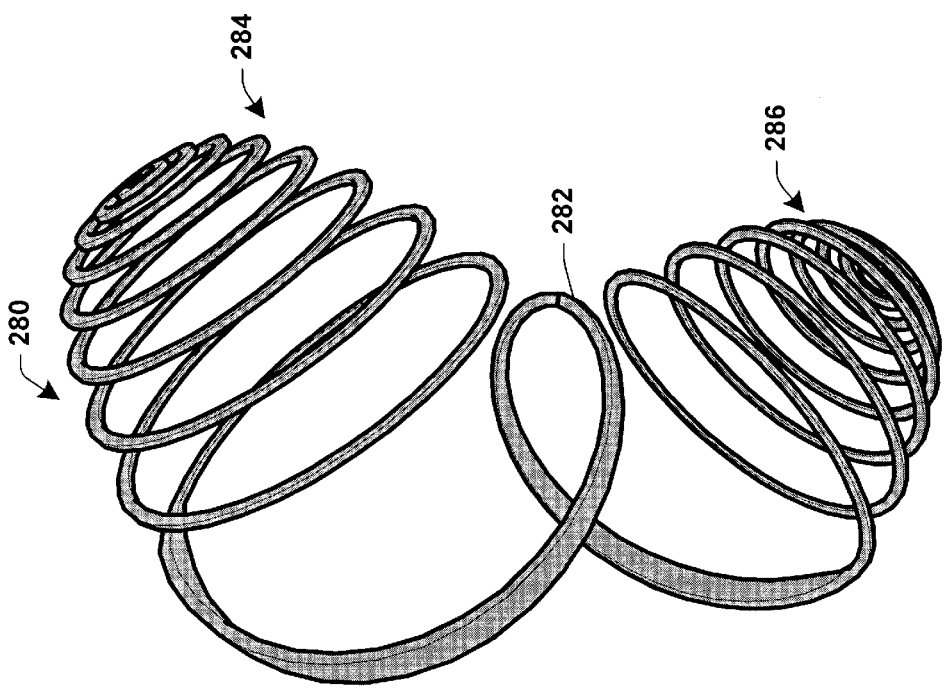
FIG. 8 is an example of a graphical representation of a three-dimensional helical path, illustrating the path being unfolded to facilitate visualization of data in accordance with the present invention.

Another way to present a user with a substantially unoccluded two-dimensional representation of a selected segment of the three-dimensional representation is illustrated in FIGS. 8 and 9. In FIG. 8, a three-dimensional helical path 280, such as the helical path 260 of FIG. 6, is animated to show the path unfolding at (or near) a selected point 282 along the spiral so as to provide two side-by-side three-dimensional spiral portions 284 and 286. For example, one portion of the spiral 284 corresponds to an unbounded spiral representation in the past relative to the selected viewpoint 282. The other portion of the spiral 286 corresponds to an unbounded representation of the data into the future.

FIG. 9 illustrates the helical path 280 fully unfolded relative the selected point 282, such as a center of interest (user selected or selected by programmatic control). Each portion 284, 286 of the helical path may thus be viewed as a two-dimensional spiral, such that associated segments of each portion are substantially unoccluded. This view helps perceive periodic relationships for data on each portion 284, 286. A user may operate (e.g., via associated user interface elements) at a local subsection of a selected portion of the helical path 284, 286 for which additional information may be obtained. Other data visualization techniques may, in turn, be utilized to provide corresponding information to the user. In a particular example, if this construction is used to represent time-based data, the user can essentially see, at once, all represented time. Regions of time that are the center-of-interest are shown at the periphery of both ends of the unfolded three-dimensional helical path. Regions of time that are less important are shown nearer the centers of each half of the unfolded three-dimensional helical path.

Those skilled in the art will understand and appreciate various ways to transition between a contextual view of the three-dimensional representation and a view that shows additional details. By way of illustration, a virtual camera may move towards the helical path to show a selected section in greater detail. Another example is to decrease the focal length of the virtual camera while moving the focal point closer to the helical path. This change in perspective view transformation causes portions of the helical path closer to the user's viewpoint to progressively take up more of the viewing area while diminishing the display of regions that are less important to the user. Warping also may be employed via the appropriate user selection to modify the width or other dimensions of the helical path for showing additional information. Another example would be to warp the image to provide a fish eye view for a selected section of the helical path.

Because time is a natural dimension to represent via spirals, various dimensions of data associated with particular moments in time may be associated with selectable viewpoints for various segments along the helical path. For example, simple textual annotations may be implemented directly onto selected parts of a timeline represented as a three-dimensional spiral and/or helical path, in accordance with an aspect of the present invention. However, this approach is limited in the amount of the information that may be associated with a particular segment. While differentially thickening selected portions of the helical path to provide additional space for displaying the information, it may be desirable to associate other dimensions of data with various segments along the helical path through other warping and animation techniques.

For example, FIG. 10 illustrates an example of a three-dimensional helical path 300 that may be employed to visualize data in accordance with an aspect of the present invention. The helical path 300 includes end portions 302 and 304 spaced apart from each other relative to an elongated central axis 306. The helical path 300, which is similar to the helical path of FIG. 6, has a plurality of segments indicated at 308 located along the path between end portions 304 and 306 thereof. A central portion of the helical path 300 has been widened as a center of interest. Because of this widening, regions that are not at the center-of-interest are compressed to a greater degree than in FIG. 6. As mentioned above, textual annotations and/or graphical depictions may be mapped directly on the helical path in connection with an appropriate time-based segment 308 to visually inform a user about other data values associated with the segment.

FIG. 11 illustrates an example in which a three-dimensional helical path 320 is utilized to display an unbounded dimension of data, such as time, between axially spaced apart end portions 322 and 324. A wheel 326 is associated with a particular portion of a segment 328 along the helical path 320 to visualize one or more other dimensions of data associated with the selected segment. For example, the wheel 326 includes a plurality of facets 330, such as may be associated with a bounded dimension of data. That is, each facet may visually depict different information associated with some aspect of the selected segment 328 in an interactive manner. The faceted wheel 326, for example, may be animated to rotate about the segment of data 328 to which it is associated to permit the user to easily select and view data associated with the occluded facets.

By way of example, the faceted wheel may be used to show more information about regions of the three-dimensional spiral in several different ways. It may be fixed to the center-of-interest 328. The user may also independently assign the faceted wheel 236 to highlight a region of the three-dimensional helical path different from that which is the center-of-interest. In this method, during a drag operation with a suitable input device (or under computer application control) the faceted wheel 326 will appear to slide around the track of the three-dimensional helical path 320. Appropriate information associated with the current position of the wheel 326 relative to the three-dimensional helical path 320 may be mapped to the facets of wheel. As the faceted wheel 326 slides around the track it may either maintain its size or diminish and grow to appropriately accommodate the surrounding geometry of the three-dimensional helical path 320. The user may desire to view additional data from multiple regions of the path 320 at one time. To accommodate this, multiple instantiations of the faceted wheel 326 may be displayed, each shown attached to different locals on the track of the three-dimensional helical path 320. Practitioners skilled in the art will also appreciate that these methods for displaying and moving one or more faceted wheels can also be used for displaying and moving any of the subsequently mentioned data layering visual display techniques.

Figure 12:
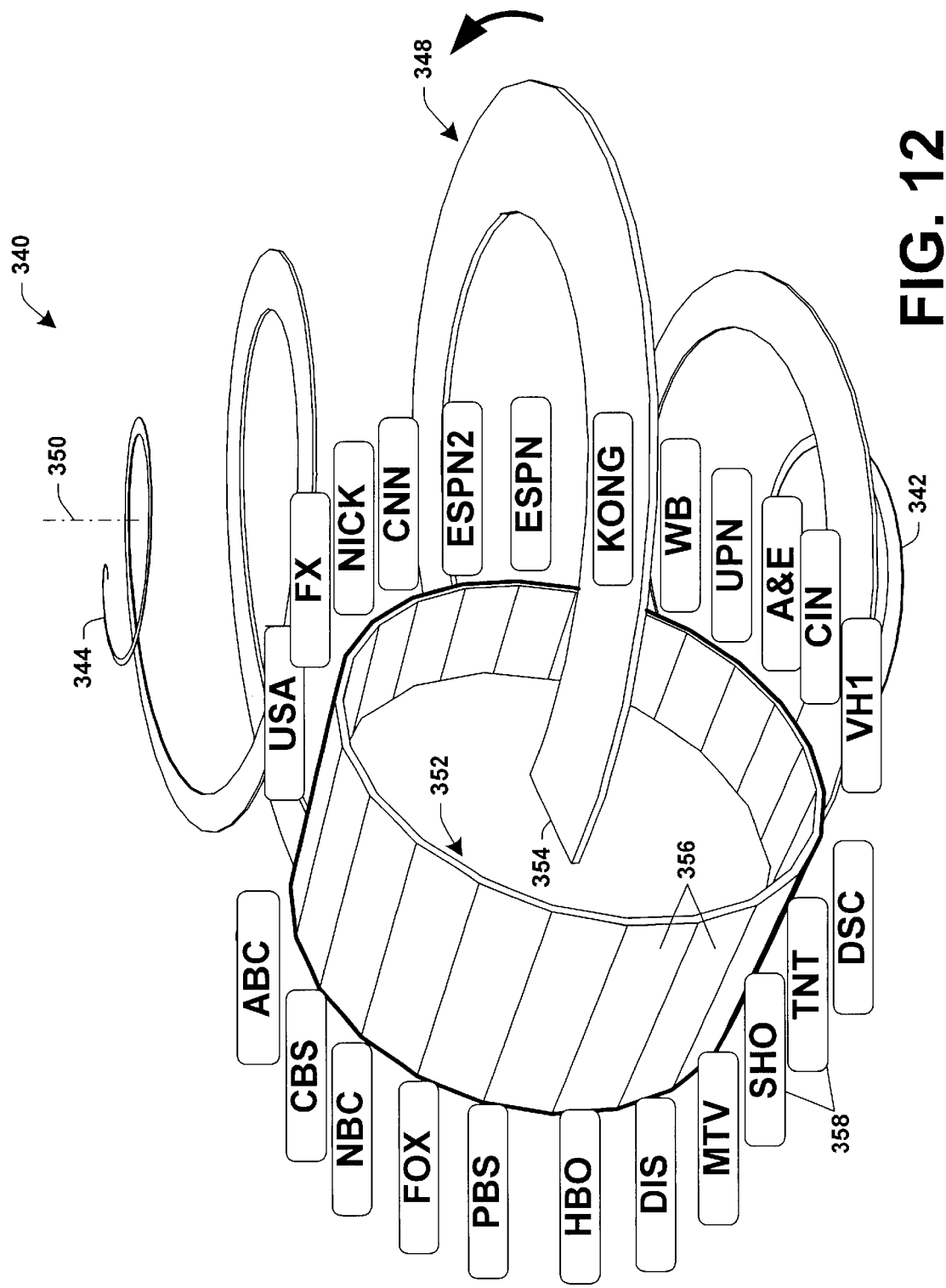
FIG. 12 is the visualization of FIG. 11 implemented as an electronic program guide in accordance with the present invention.

FIG. 12 illustrates a particular example of an interactive three-dimensional visualization 340 implemented as an EPG for visualizing audio and/or visual programming data in accordance with an aspect of the present invention. The visualization 340 is based on the design 320 shown and described with respect to FIG. 11. Briefly stated, the visualization 340 is in the form of a generally helical path having axially spaced apart ends 342 and 344, with an intermediate portion 348 extending between the ends and circumscribing a central axis 350. The length of the path 340 between the ends 342 and 344, for example, represents an unbounded dimension of data, such relative to an intermediate center of interest (e.g., the present).

The helical path 340 further includes an interactive wheel 352 that provides a user interface for selecting additional information about programming content for a user-selected viewpoint 354 along the helical path. By way of further illustration, the wheel 352 includes a plurality of facets 356 associated with channels in a given tuning space. In this example, each channel is identified by corresponding textual information printed on a placard 358 associated with a corresponding facet 356. It is to be understood and appreciated, however, as the bandwidth for a tuning space increases, the associated number of channels may tend to approach an unbounded condition and, therefore, another dimension of programming data may be more appropriately associated with the faceted wheel 352. For example, as an alternative to mapping channels to facets 356, each facet could be associated with a different type of program data, such as by program categories, e.g., sci-fi, talk shows, news, financial, health, history, sports, nature, etc. Alternatively, another unbounded three-dimensional spiral may be used to represent the list of channels and this channel spiral may be attached to a particular segment of the three-dimensional helical path 340 that represents time.

Each facet 356 further may operate as a selectable user interface element, which is operative to draw out additional information associated with the selected facet. In order to find additional information about a particular channel associated with the facet 356, for example, the user may select the facet, which in turn may reveal another graphical display (e.g., another interactive user interface element). The graphical display, in turn, presents the user with program selections and/or additional levels of hierarchal information based on the selected facet 356.

Figure 13:
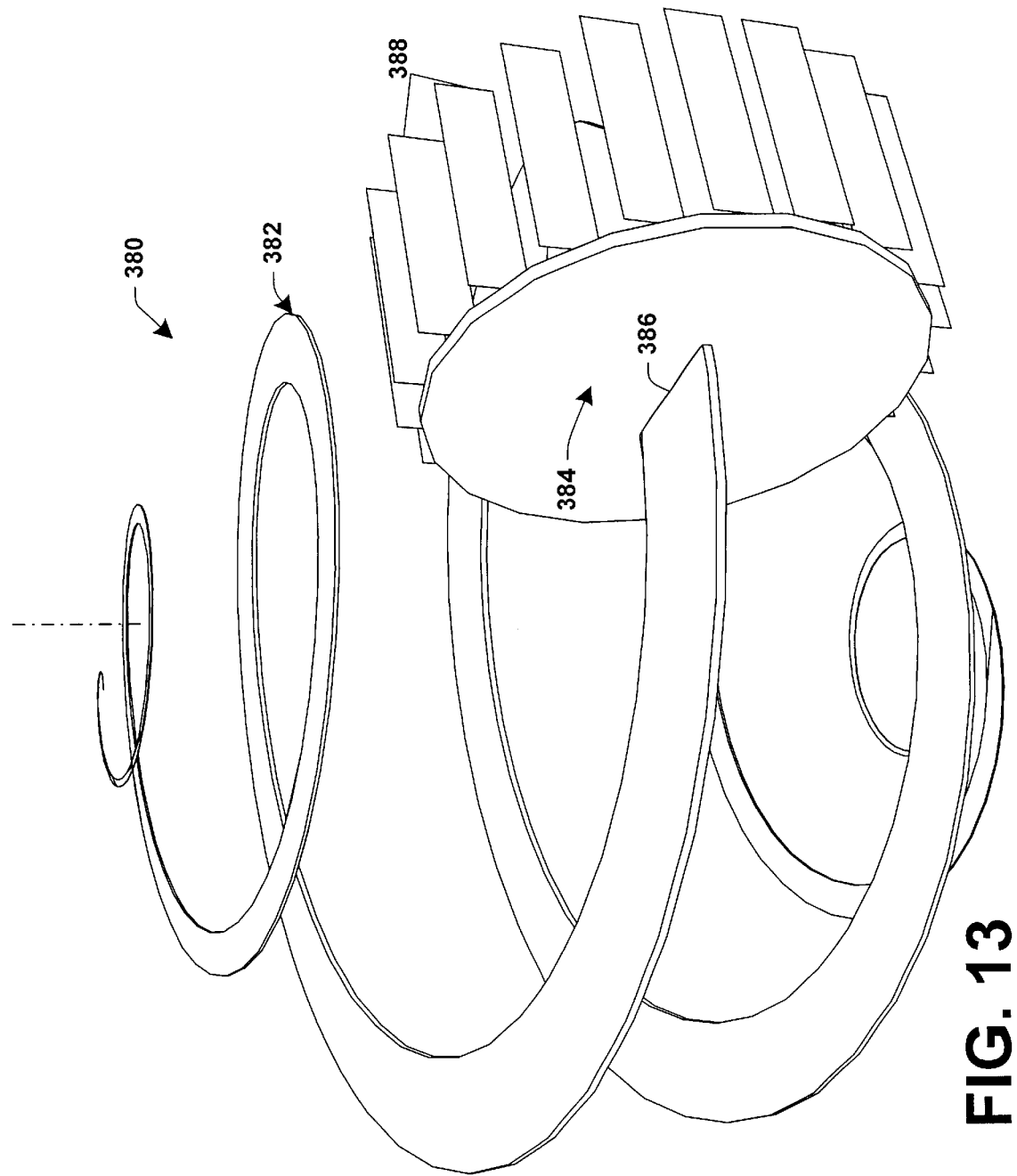
FIG. 13 is another example of a helical path implemented in conjunction with a three-dimensional visualization element in accordance with the present invention.

FIG. 13 illustrates an example of another data visualization 380 that includes a three-dimensional helical path 382 similar to that shown in FIG. 11 and 12. A wheel 384 is centered about a user-selected viewpoint 386. In this example, the wheel 384 includes facets 388 that are aligned generally with the page or screen to facilitate viewing of the information associated with such facets, such as may include textual and/or graphical information. As in the examples of FIGS. 11 and 12, the facets 388 may provide user interface elements, which are operative to effect animation of the visualization 380 and, in turn, present further information (e.g., another dimension of stored data) corresponding to the selected facet.

Figure 14:
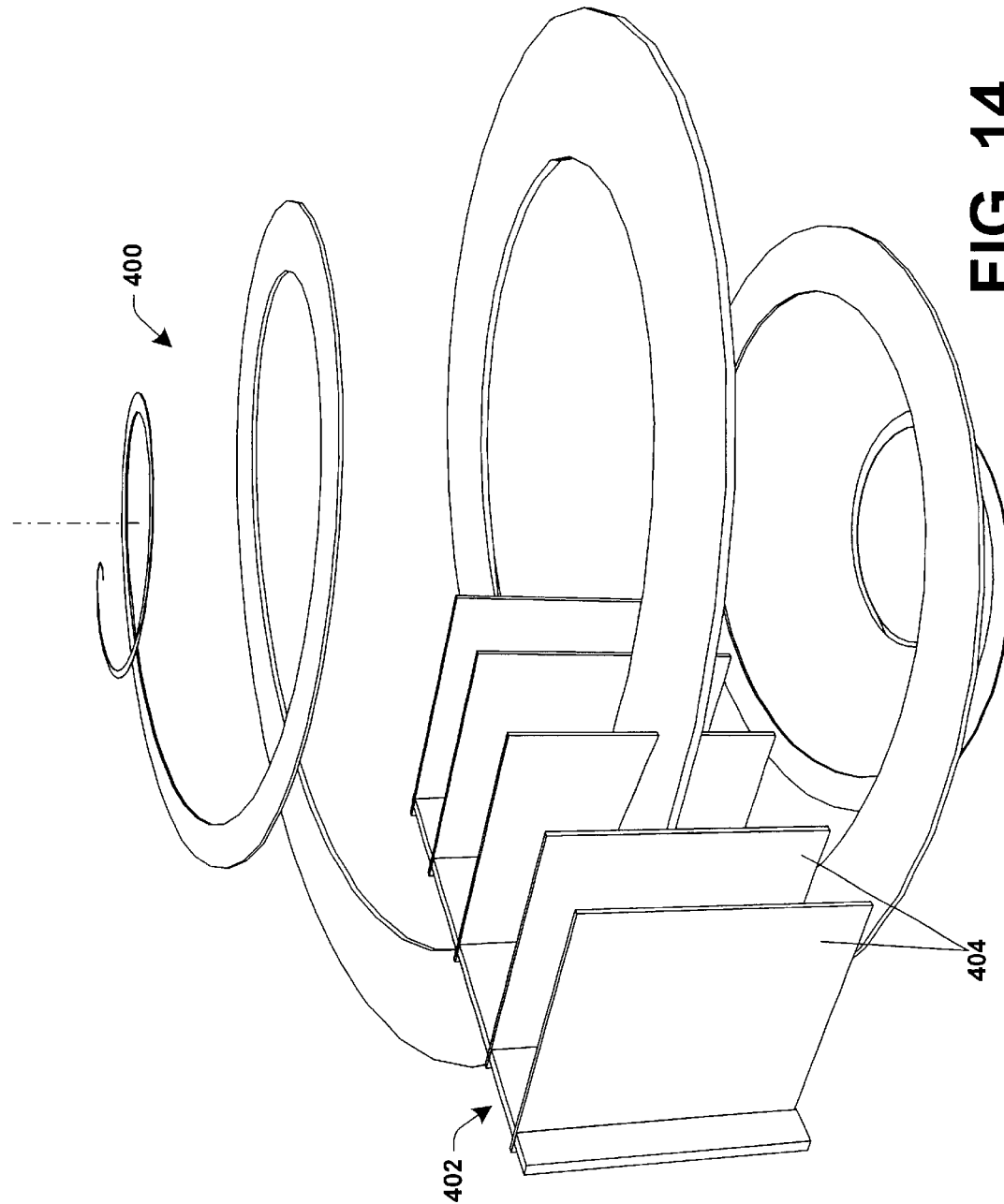
FIG. 14 is another example of a helical path implemented in conjunction with a three-dimensional visualization element in accordance with the present invention.

FIG. 14 illustrates another example of three-dimensional helical path 400 that may be utilized to visualize multidimensional data in accordance with an aspect of the present invention. The helical path 400 is substantially similar to that shown and described with respect to FIGS. 11–13, excluding the wheel element. Another three-dimensional user-interface element 402 has been implemented onto the three-dimensional helical path 400 to help visualize additional dimensions of data associated with a selected segment along the helical path. In this example, one or more additional dimensions of data are presented in the form of interactive graphical cards or windows 404 that are generally aligned with the page or screen to display data associated with a selected segment of the helical path. While five such cards 404 are illustrated in this example, it is to be appreciated that any number of such cards (or other graphical display elements) could be employed.

Figure 15:
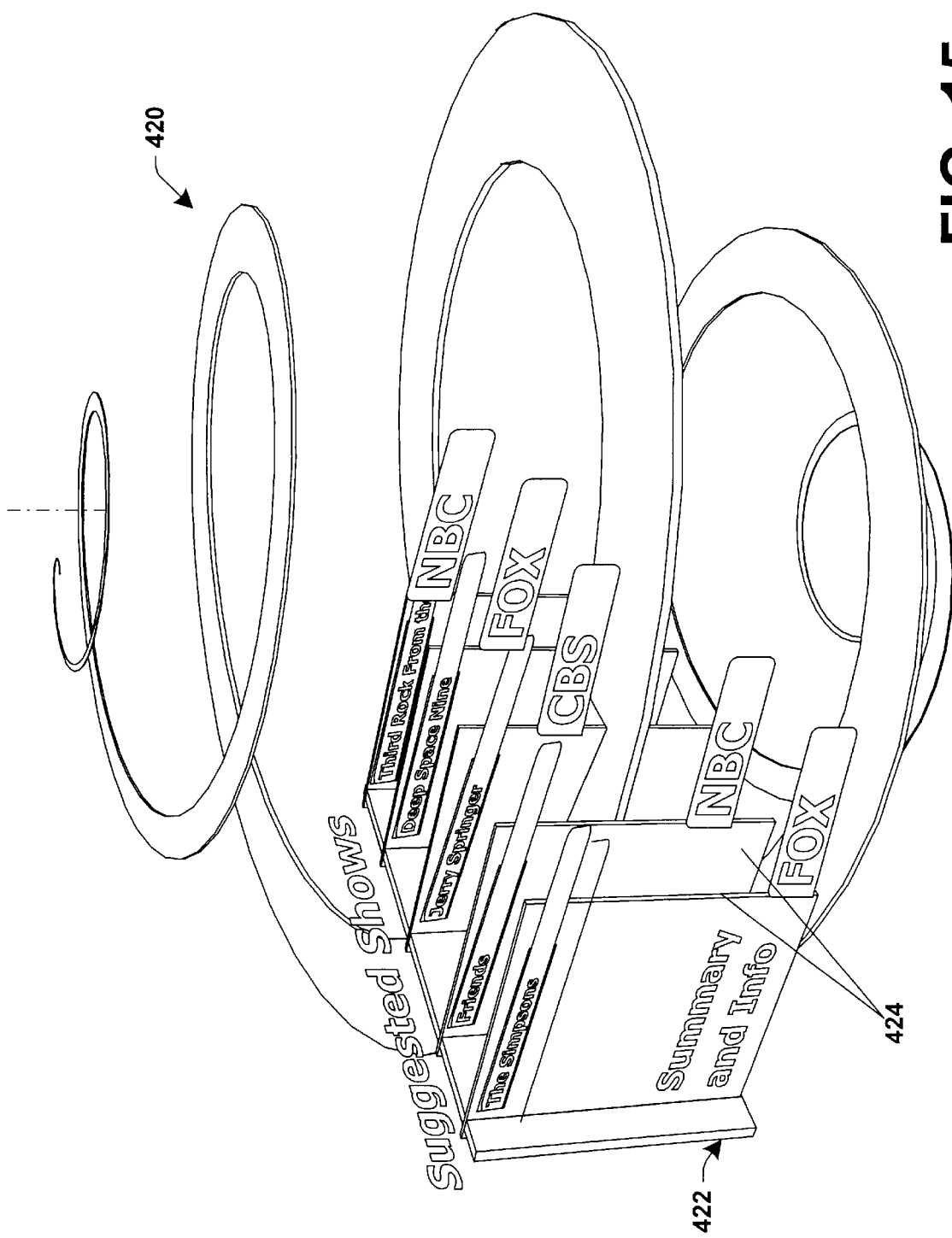
FIG. 15 is the visualization of FIG. 14 implemented as an electronic program guide in accordance with the present invention.

By way of particular illustration, FIG. 15 illustrates the helical path 400 of FIG. 14 implemented as an EPG 420 in accordance with an aspect of the present invention. An interactive user interface element 422 is associated with a selected segment of the EPG 420 to provide information, for example, relating to suggested shows for that segment of the helical path. Information identifying each suggested show is displayed in connection with a three-dimensional card or window 424. The suggested shows (or other data) may result from filtering of shows available in a user's associated tuning space for the selected segment (e.g., a time period). Such filtering, for example, may be based on a user's viewing history, user-configured filtered, filters created by service providers (e.g., a Web-based subscription), collaborative filtering techniques, or other filters that may be implemented in the system. Each card 424 further operates an interactive user interface element that may contain links to other displays, such as may identify the channel or channels on which the selected program or programs will air or other useful information associated with a suggested program. Upon selecting a particular card 424 (either under user or programmatic control), that card could animate from its stowed position, vertically into a position where its entire contents can be read without occlusion.

Figure 16:
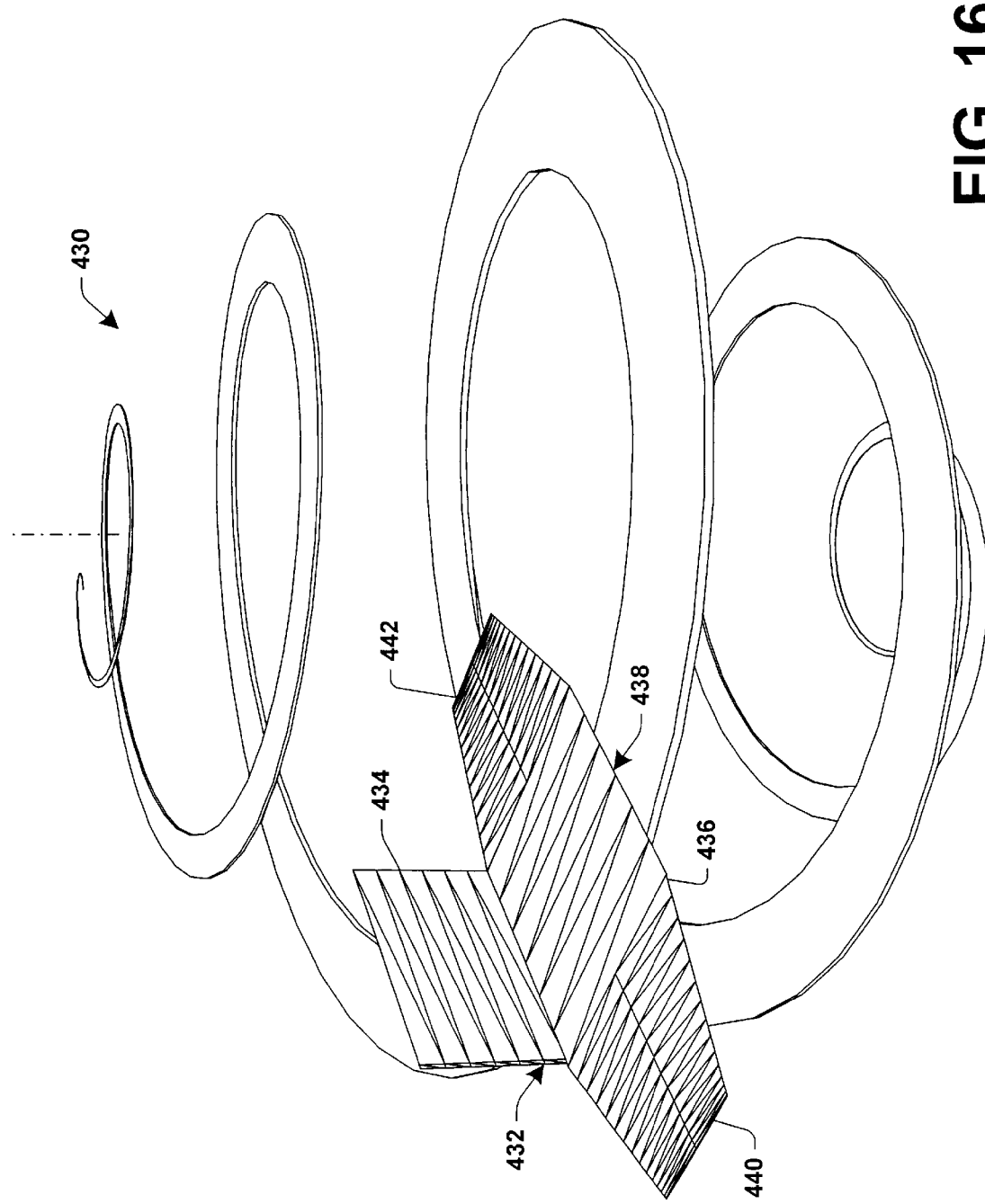
FIG. 16 is another example of a helical path implemented in conjunction with a three-dimensional data visualization element in accordance with the present invention.

FIG. 16 illustrates another example of an interactive graphical representation of a three-dimensional helical path 430 that may be utilized to visualize multi-dimensional data in accordance with an aspect of the present invention. An unbounded dimension of the data (e.g., time) may be associated with segments or intervals along the length of the helical path 430. One or more other dimensions of data may be associated with each segment, such as may be visualized by various techniques upon selection of a corresponding user interface element along a segment of the helical path.

In this example, an interactive user interface element for other data associated with a selected segment of the helical path 430 is provided in the form of a perspective wall 432. The wall 432 includes a first wall portion 434 that represents a bounded dimension of data. The wall portion 434 extends generally perpendicular from a floor portion 436 that corresponds to a substantially unbounded dimension of data. The floor portion 436, for example, visualizes data by employing a known fish-eye visualization technique, such that a central portion 438 of the fish-eye corresponds to a center of interest for visualizing corresponding data more clearly. A user thus may navigate between ends 440 and 442 of the fish-eye portion with a suitable user input device, which will cause corresponding data to be mapped to the center of interest 438. The wall portion 434 further may display additional information, such as associated with the selected segment of the helical path 430 or a selected part of the floor portion 436. This allows for the facile nesting of the display of an unbounded dimension onto a particular locale of the three-dimensional helical path 430.

In the context of an EPG, channels or categories of programs may be mapped into the fisheye portion 438, such as in a preselected order between the ends 440 and 442. The perpendicular portion 434, in turn, may present program information associated with a selected segment of the fish-eye portion for the selected time segment along the helical path 430. Those skilled in the art will understand and appreciate other arrangements of programming data that may be implemented in the data visualization 430 shown in FIG. 16, all of which are contemplated as being within the scope of the present invention.

Figure 17:
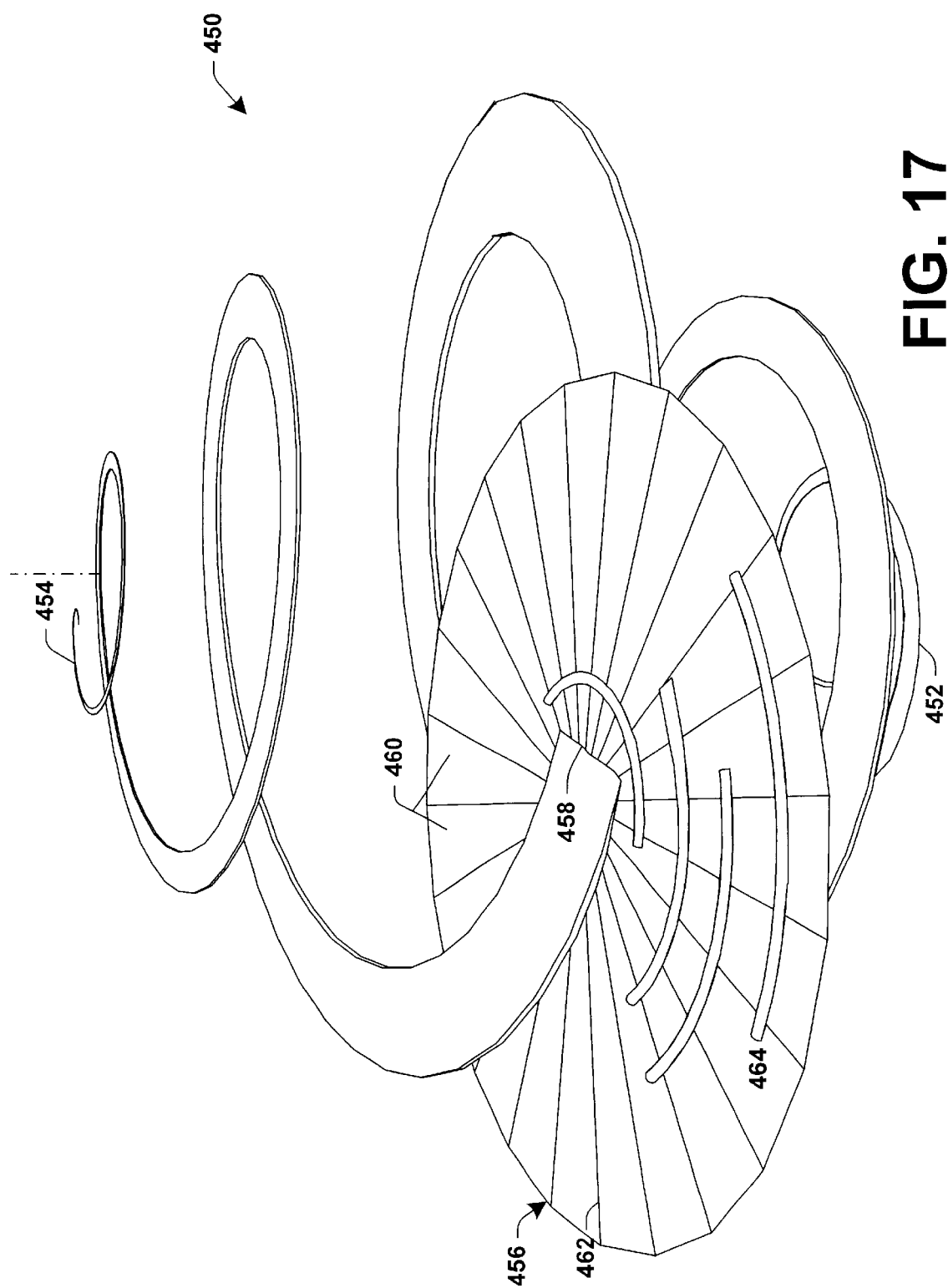
FIG. 17 is another example of a helical path implemented in conjunction with a spiral visualization element in accordance with the present invention.

FIG. 17 is yet another example of a three-dimensional graphical representation of a helical path 450 which is operable to visualize time-based data in accordance with an aspect of the present invention. An unbounded dimension of data is represented as segments located between axially spaced apart ends 452 and 454 of the helical path 450. Each segment along the helical path 450, for example, corresponds to a time period, such as a day, an hour, or other selected time period. The stored data includes hierarchal data having a plurality of dimensions, with one or more other dimensions of data being associated with each segment along the helical path 450.

In the example of FIG. 17, the visualization also includes a generally flat two dimensional graphical representation 456 to further visualize one or more additional dimensions of data associated with a segment 458 of the helical path 450, such as a segment that has been selected with a user input device. The particular two-dimensional representation 456 includes a perspective view of a generally circular graphical user interface element intersecting through the selected segment 458 of the three-dimensional helical path 450. The circular element 456 includes a plurality of pie-shaped wedges 460 extending radially from a center of the circular element.

Each wedge 460, for example, corresponds to a portion of the selected time segment of within the selected segment, such as spanning clockwise from starting point, indicated at 462. A plurality of graphical arcs 464 are superimposed onto associated wedges 460 at different radii of the circular element 456 to visualize different data values associated with each respective arc. It is to be appreciated that the circular element 456 also could be implemented, in accordance with an aspect of the present invention, as a two-dimensional spiral to, in turn, facilitate visualization of periodic relationships between the data for the selected segment 458 visualize the additional dimension(s) of data.

For the example of an EPG, the circular element 456 may represent a plurality of time slots, in which each arc 464 represents one or more programs that are scheduled for the time slots spanned by each respective arc. More particularly, the arcs 456 may represent particular programs that have been selected to be recorded and/or suggested programs meeting predetermined program criteria. Those skilled in the art will understand and appreciate additional levels of visualization that may be implemented in conjunction with the helical path 450, such that selection of an arc 464 may cause other associated data (e.g., a description of the program, casting and/or director information, etc.) to be displayed to the user. Moreover, color-coding schemes could be utilized to represent different properties associated with various programs, such as programs scheduled for recording, special programs, etc.

Figure 18:
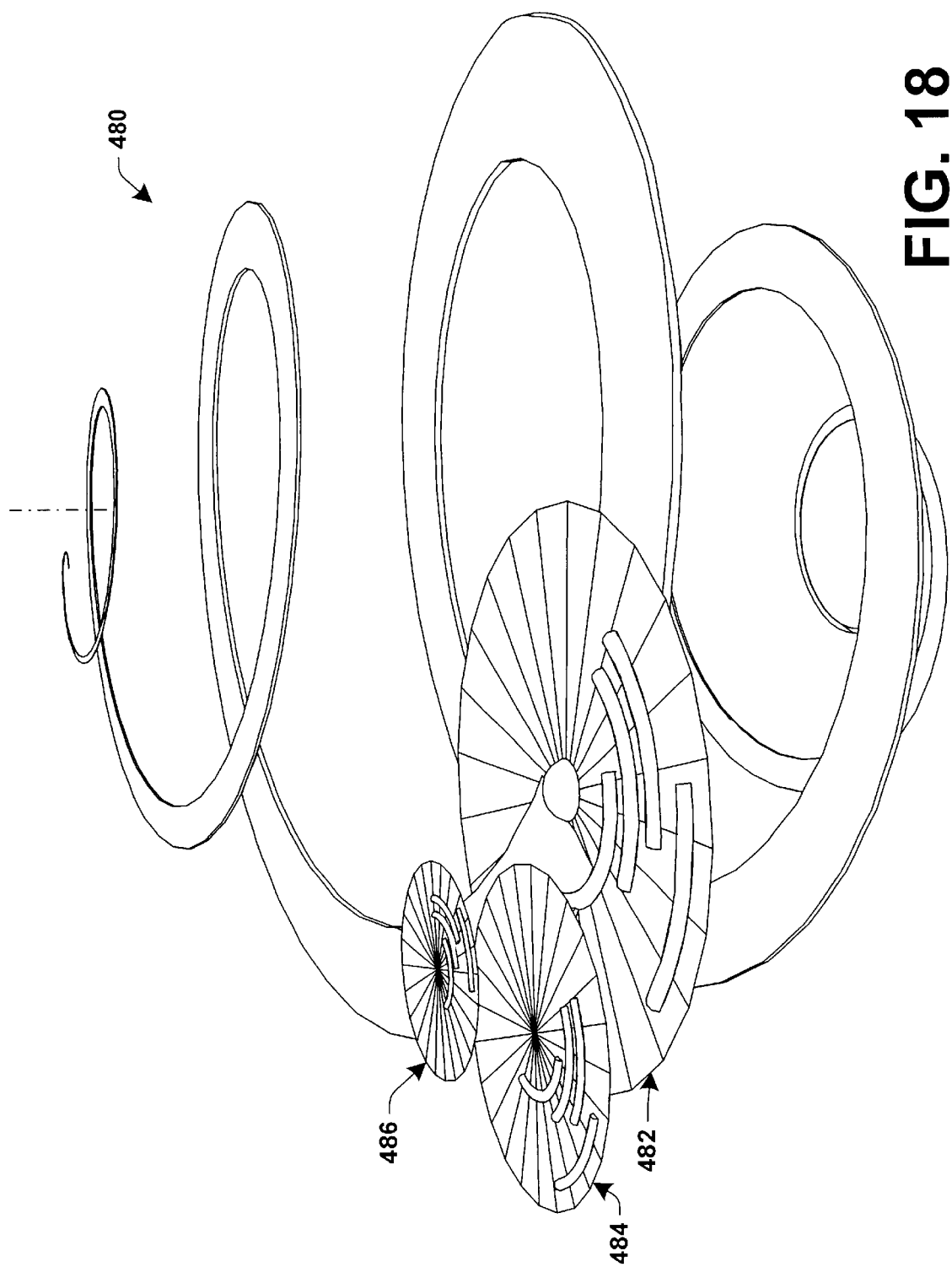
FIG. 18 is another example of a helical path implemented in conjunction with a plurality of spiral visualization elements in accordance with the present invention.

FIG. 18 is another example of a graphical representation of a three-dimensional helical path 480 which is operable to visualize data having one or more unbounded dimensions in accordance with an aspect of the present invention. The three-dimensional path 480 is substantially similar to that of FIG. 17, although more than one circular user interface element 482, 484, 486 is associated with the helical path. As a result, the visualization is able to display detailed information associated with a plurality of selected segments along the helical path concurrently.

Figure 19:
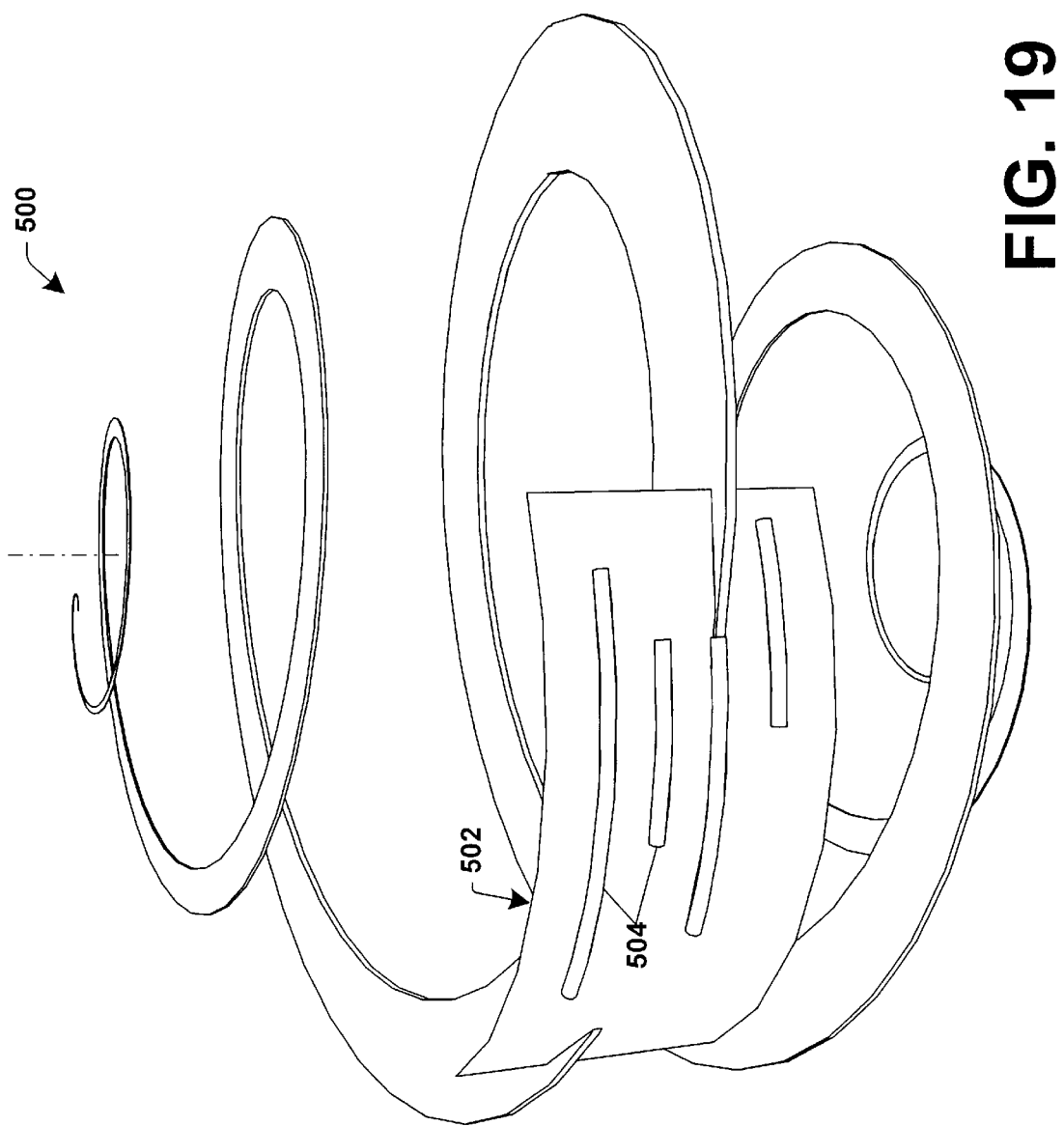
FIG. 19 is an example of a helical path implemented in conjunction with a three-dimensional data visualization element in accordance with the present invention.

FIG. 19 illustrates another example of an interactive graphical representation of a three-dimensional helical path 500 operable to visualize multi-dimensional data in accordance with an aspect of the present invention. In this example, one or more additional dimensions of data associated with a segment of the helical path 500 may be visualized by mapping such other data to a graphical pop-up window or generally planar graphical representation of data, indicated at 502, associated with the segment. The window 502 provides a user interface to facilitate retrieving and visualizing additional information. Individual records of information associated with a selected segment may be mapped to the window 502 as generally linear visualizations 504 of data (e.g., textual and/or graphical). Each linear visualization 504 on the window 502, for example, extends a length indicative of a time or duration for the data being represented.

Figure 20:
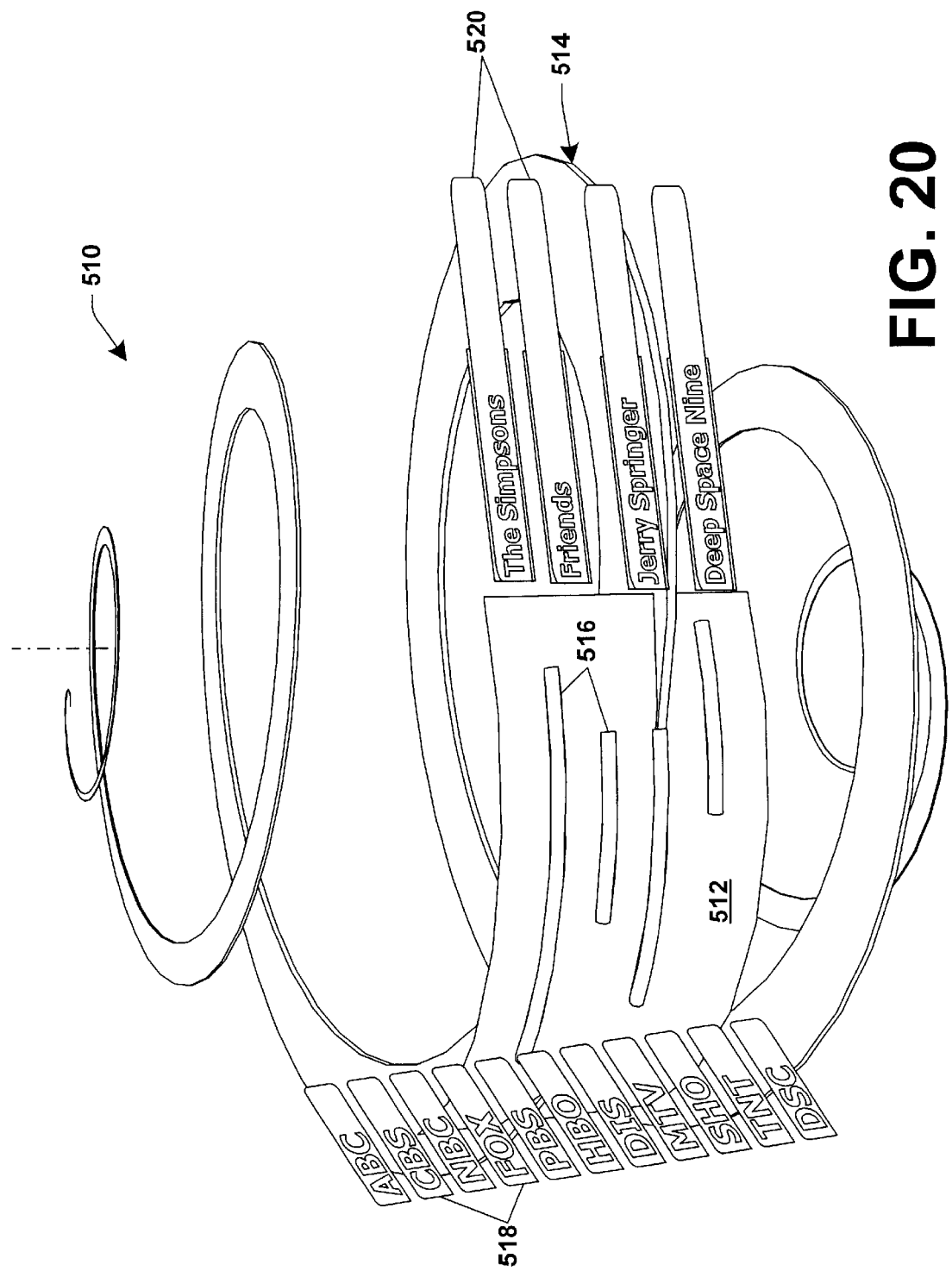
FIG. 20 is the visualization of FIG. 19 implemented as an electronic program guide in accordance with the present invention.

By way of further illustration, FIG. 20 illustrates an EPG 510 implemented according to the three-dimensional interactive visualization 500 of FIG. 19. In this example, a window 512 is displayed for a selected segment of a three-dimensional helical path 514, which window may include a generally linear visualization arrangement to display time-based programming information, such as textual and/or graphical program information similar to a conventional program listing. More particularly, the window 512 includes a plurality of features 516 that represent detailed program data associated with the selected segment.

By way of further illustration, the window 512, for example, includes a plurality of channel interface elements 518 that provide an interactive graphical user interface for associated channels. While a limited number of channels are illustrated in FIG. 20, it is to be appreciated that any number of channels could be mapped to the visualization 510. Textual and/or graphical user interface elements 520 corresponding to more specific program selections also are associated with the window 512, such as may identify programs that have been selected to be recorded or other categories of programs. Additionally or alternatively, the program information may identify suggested programs, such as based on a program filter, which may be configured by the user or a service to which the user subscribes. Both the channel and program elements 518, 520 may be interactive user interface elements that operative to cause additional information to be presented to the user, such as through selective animation and/or warping of the current helical path 514 and by appropriately mapping data onto the graphical display.

Figure 21:
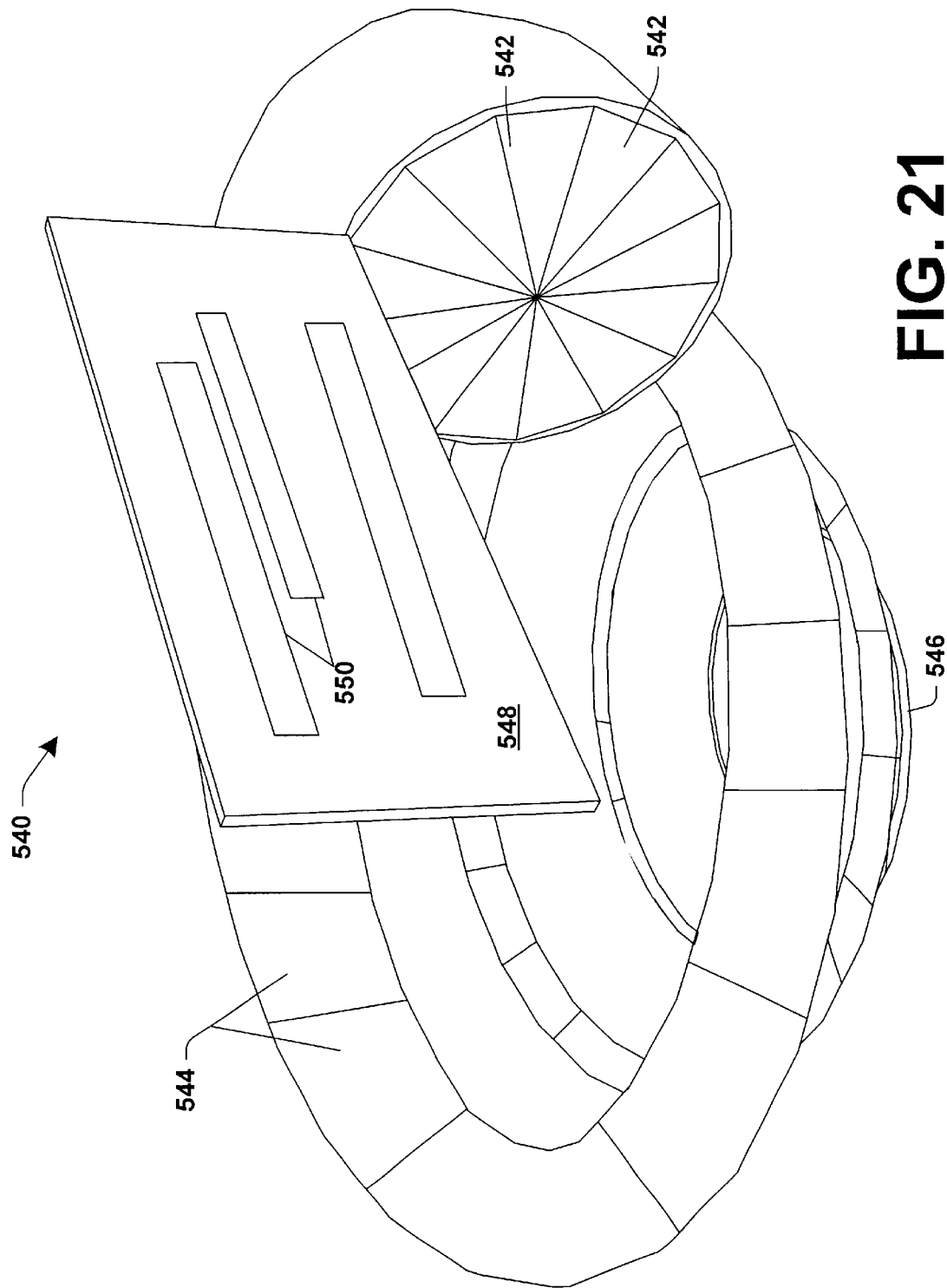
FIG. 21 is an example of a three-dimensional helical path that may be employed to visualize data in accordance with the present invention.

FIG. 21 illustrates yet another interactive graphical representation of a three-dimensional helical path 540 that may be employed to visualize data in accordance with an aspect of the present invention. In this example, the body of the helical path 540 is configured as a generally cylindrical pipe having a plurality of elongated wedges 542 extending through a central part of the pipe. Additionally, the helical path 540 includes a plurality of consecutive segments 544 extending along the length of the path. While the illustrated helical path representation has one unbounded end 546, it will be appreciated by those skilled in the art that such configuration could be adapted to a helical path having two opposed unbounded ends, similar to that shown and described with respect to FIGS. 3–6, and 10. To accommodate this, the three-dimensional helical path may be split at the center-of-interest. The split occurs over a width sufficient to provide the user with an unobstructed view of both ends of the split region of the interior of the tubular three-dimensional spiral. The region within the split can be represented semi-transparently, displaced in another direction, not shown at all, or via any of several other commonly used visual display methods.

By way of illustration, animation may be employed to visualize additional information associated with a selected segment 544 of the helical path 540. For example, the helical path 540 may appear to cut transverse relative to the selected segment, thereby exposing pie-shaped cross sectional features 542 of the helical path. Each wedge 542 of the cross section may represent different information. In the context of an EPG, for example, each wedge 542 may correspond to a different channel, a different type or category of program information, or other program-related data, etc. Each wedge may provide an associated user interface element, which may be selected to retrieve and display additional information associated with the selection.

In this example, selection of a wedge 542 results in a pop-up window or other type of graphical element 548 being displayed adjacent the selected wedge to visualize other information (e.g., other dimensions of data) for that wedge. Continuing with the example of an EPG, the window 548 may include a graphical and/or textual display of information 550 identifying particular programs and their respective scheduled broadcast times that they are being broadcast on a channel or network associated with the wedge. Alternatively, the wedge may identify particular programs in a program genre identified by the wedge, such as may provide associated information, including, for example, broadcast time, channel, and program name, casting information (and/or other information). Those skilled in the art will understand and appreciated various other arrangements of programming data that may be implemented in connection with the helical path 540 of FIG. 21, all of which are contemplated as falling within the scope of the present invention.

Figure 22:
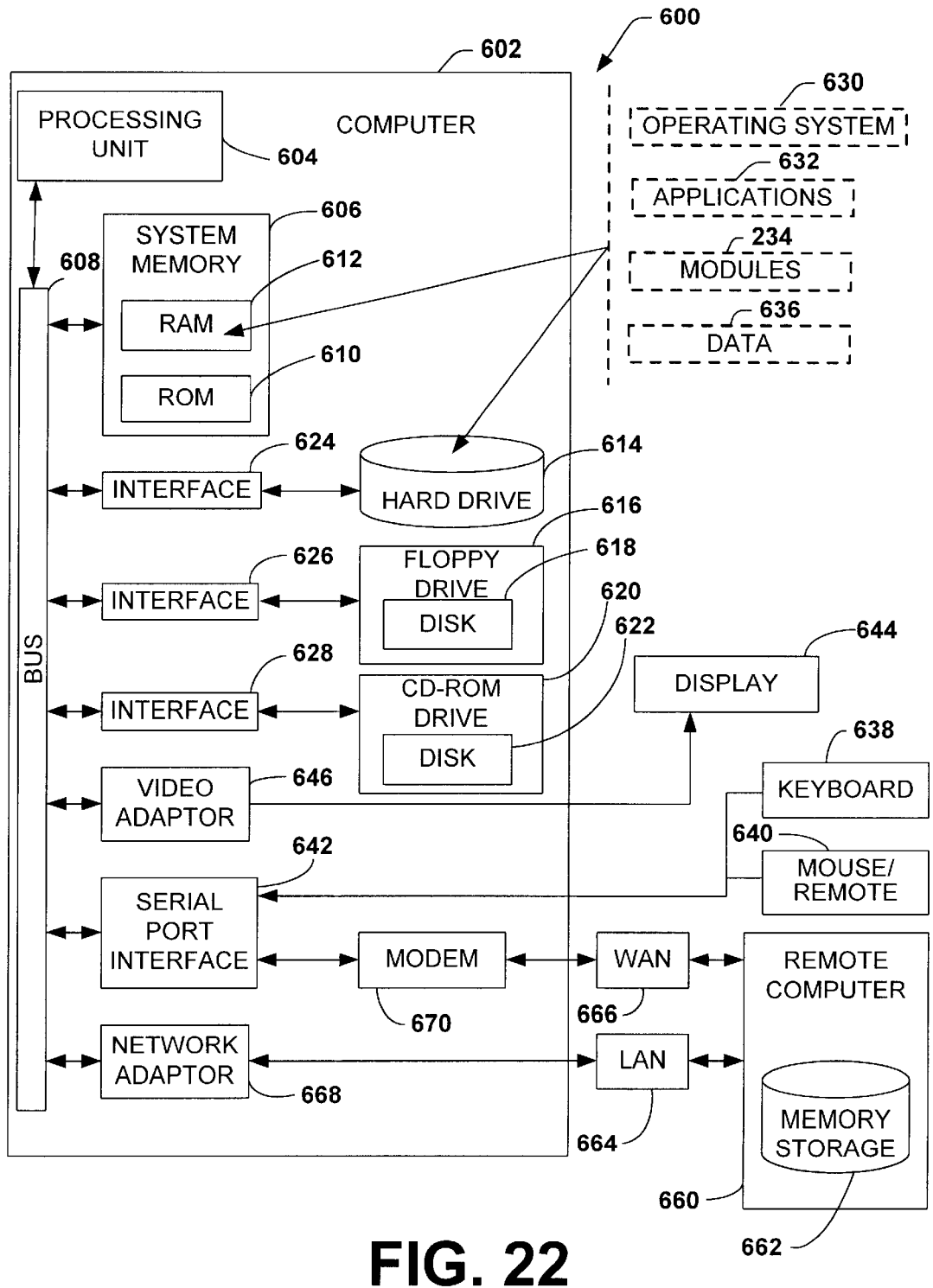
FIG. 22 is an example of an operating environment for implementing a system or method in accordance with the present invention.

In order to provide additional context for the various aspects of the present invention, FIG. 22 and the following discussion are intended to provide a brief, general description of a suitable environment 600 in which the various aspects of the present invention may be implemented. While the invention has been described above in the general context of computer-executable instructions of a computer program that runs on a local computer (e.g., a set top box or personal computer) and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers or other hardware equipment. In a distributed computing environment, program modules may be located in both local and remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component.

With reference to FIG. 22, an exemplary system environment 600 for implementing the various aspects of the invention includes a conventional computer 602, such as may be implemented in a set-top box. The computer 602 includes a processing unit 604, a system memory 606, and a system bus 608 that couples various system components including the system memory to the processing unit 604. The processing unit 604 may be any available processor, dual microprocessors or other multi-processor architecture.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system 600 memory includes read only memory (ROM) 610 and random access memory (RAM) 612. A basic input/output system (BIOS), containing the basic routines that help to transfer information between elements within the computer 602, such as during start-up, is stored in ROM 610.

The computer 602 also may include, for example, a hard disk drive 614, a magnetic disk drive 616, e.g., to read from or write to a removable disk 618, and an optical disk drive 620, e.g., for reading from or writing to a CD-ROM disk 622 or other optical media. The hard disk drive 614, magnetic disk drive 616, and optical disk drive 620 are connected to the system bus 608 by a hard disk drive interface 624, a magnetic disk drive interface 626, and an optical drive interface 628, respectively. The drives and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 600, and further that any such media may contain computer-executable instructions for performing the methods of the present invention.

A number of program modules may be stored in the drives and RAM 612, including an operating system 630, one or more application programs 632, other program modules 634, and program data 636. The operating system 630 in the computer 602 may be implemented with any operating system or combination of operating systems.

A user may enter commands and information into the computer 602 through one or more user input devices, such as a keyboard 638 and a pointing device (e.g., a mouse or remote control 640). Other input devices (not shown) may include a microphone, a joystick, a game pad, a satellite dish, a scanner, or the like. These and other input devices are often connected to the processing unit 604 through a serial port interface 642 that is coupled to the system bus 608, but may be connected by other interfaces, such as a parallel port, a game port or a universal serial bus (USB). Such input devices also may operate as wireless devices, such as employing a suitable wireless communication protocol (e.g., infrared or radio frequency). A display 644, such as a monitor, television, or other type of display device, is also connected to the system bus 608 via an interface, such as a video adapter 646. In addition to the display 644, the computer 602 may include other peripheral output devices (not shown), such as speakers, printers, etc.

The computer 602 may operate in a networked environment using logical connections to one or more remote computers 660. The remote computer 660 may be a workstation, a server computer, a router, a peer device or other common network node, and typically includes many or all of the elements described relative to the computer 602, although, for purposes of brevity, only a memory storage device 662 is illustrated in FIG. 22. The logical connections depicted in FIG. 22 may include a local area network (LAN) 664 and a wide area network (WAN) 666. Such networking environments are commonplace in offices, enterprise-wide computer networks, intranets and the Internet. For example, the computer 602 may access program data from local memory devices 606, 614, 616, 622 and/or from the memory 662 of a remote computer 660 from which a visualization in accordance with the present invention is generated.

When used in a LAN networking environment, the computer 602 is connected to the local network 664 through a network interface or adapter 668. When used in a WAN networking environment, the computer 602 typically includes a modem 670, or is connected to a communications server on the LAN, or has other means for establishing communications over the WAN 666, such as the Internet. The modem 670, which may be internal or external, is connected to the system bus 608 via the serial port interface 642. In a networked environment, program modules depicted relative to the computer 602, or portions thereof, may be stored in the remote memory storage device 662. It will be appreciated that the network connections shown are exemplary and other means of establishing a communications link between the computers 602 and 660 may be used.

In accordance with the practices of persons skilled in the art of computer programming, the present invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 614, floppy disks 618, CD-ROM 622, and shared storage system 610) to thereby reconfigure or otherwise alter the computer system's operation, as well as other processing of signals. The memory locations where such data bits are maintained are physical locations that have particular electrical, magnetic, or optical properties corresponding to the data bits.

Figure 23:
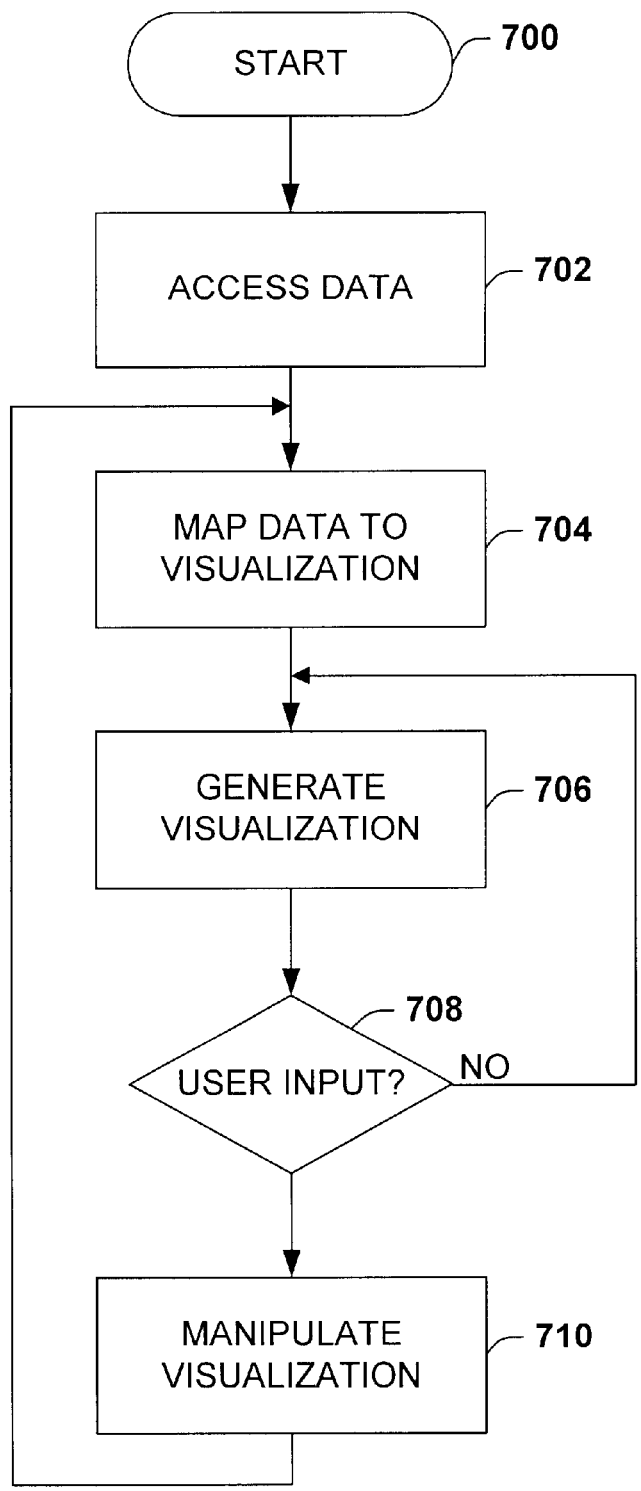
FIG. 23 is a flow diagram illustrating a methodology for visualizing data in accordance with the present invention.

In view of the foregoing structural, functional, and graphical features described above, a methodology in accordance with the present invention will be better appreciated with reference to FIG. 23. While, for purposes of simplicity of explanation, the methodology of FIG. 23 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

Referring to FIG. 23, the methodology begins at 700, such as may coincide with activation of an interactive visualization according to the present invention. In addition, stored data (including program components and other data) may be loaded into active memory. At 702, multi-dimensional data is accessed, such as may be stored in one or more associated data storage systems (local or remote). The data includes one or more substantially unbounded dimension of data, such as time. That is, the data may characterize information having records associated with different periods of time. By way of particular illustration, the data may characterize audio and/or visual programming over an extended period of time, such as title, description, broadcast date, broadcast time, actors/actresses, program genre, category, etc.

At 704, one or more selected aspects of the data are mapped to corresponding parts of the graphical visualization. As described hereinabove, the visualization may include a graphical representation of a three-dimensional helical path extending between axially spaced apart ends (See, e.g., FIGS. 3–21). In accordance with a particular aspect of the present invention, a substantially unbounded dimension of the data (e.g., time) may be mapped to the helical path, such that the visualization provides an interactive user interface for selecting corresponding parts of different data located along the helical path. That is, the path may include time-based segments, each of which is associated with data for a different respective time period. At 706, a corresponding interactive visualization is generated according to the mapping of data to the visualization.

As mentioned, the visualization provides an interactive interface operative to receive user instructions indicative of viewing preferences for the data being displayed in the visualization. Thus, at 708, a determination is made as to whether a user input has been received. If no user input is received, the methodology may loop until an input is received. Alternatively, those skilled in the art will understand and appreciate various default visualization techniques that could be implemented relative to the visualization generated at 706 in accordance with an aspect of the present invention.

If a user input is received via a corresponding user interface element, the methodology proceeds to 710 in which the visualization is manipulated, such as through modification of the data being mapped to the visualization. Those skilled in the art will appreciated various levels of animation may be employed to cause one or more other dimensions of the stored data to be displayed relative the visualization. For example, other interactive user-interface element or visualizations may be graphically added to the existing display. Alternatively or additionally, the existing visualization (706) may be animated, such as by implementing desired warping and/or zooming of the visualization, to better visualize data associated with a user-selected viewpoint. For example, the animation may help show a periodic nature of the certain types of the stored data or more detailed textual and/or graphical information.

By way of particular illustration, the visualization may be part of an EPG implemented on a computer or set-top box programmed and/or configured to visualize audio and/or visual programming data over a selected time period. The time period, in accordance with an aspect of the present invention, may be mapped along the helical path of the visualization, with other programming data being accessible for visualization in response to selection or activation of user interface elements associated with the visualization. That is, selection of a segment (e.g., associated with a time period) along the helical path may result in animation of the visualization to display additional aspects of the stored programming data according to which segment is selected.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate visualization of data having at least one substantially unbounded dimension, comprising:
at least one storage system operative to store the data; and
a graphic engine operative to access the stored data and characterize the stored data as a three-dimensional graphical representation, the graphical representation including an elongated generally helical path, the helical path having a plurality of segments corresponding to different aspects of the substantially unbounded dimension of the stored data, the substantially unbounded dimension corresponding to time, the helical path having associated periodic intervals with which the stored data is associated, wherein the periodic intervals extend between ends of the helical path and the helical path tapers as a three-dimensional spiral near at least one of the ends of the helical path to substantially constitute a conical envelope, and the stored data comprises programming data indicative of at least one of audio and visual programming and the graphical representation forms part of an interactive electronic program guide operative to visualize the programming data.

2. The system of claim 1, further comprising a user interface associated with the graphic engine, the user interface operative to receive instructions based on a selection of a selectable element of the graphical representation, the graphic engine adjusting the graphical representation in response to instructions received by the user interface.

3. The system of claim 2, further comprising a mapping system associated with the storage system, the mapping system being operative to map selected data from the storage system to a corresponding part of the graphical representation, the graphic engine converting the selected data to the corresponding part of the graphical representation.

4. The system of claim 1, further comprising a user interface associated with the graphic engine, the user interface operative to receive instructions based on a selection of part of the graphical representation, the graphic engine changing the graphical representation in response to instructions received by the user interface to visualize other aspects of associated programming data.

5. The system of claim 1, further comprising a user interface element operative to select a user-controllable viewpoint of the graphical representation, the graphic engine being operative to manipulate the graphical representation to visualize the graphical representation based on the selected viewpoint.

6. A tool running as computer-executable instructions on a machine to facilitate interactive visualization of stored data, the tool comprising:
- a graphic control system operative to generate a three-dimensional graphical representation of substantially all of the stored data having at least one substantially unbounded dimension and comprises programming data indicative of at least one of audio and visual programming, the graphical representation forms part of an interactive electronic program guide operative to visualize the programming data and includes a generally helical path having associated periodic intervals with which the stored data are associated, selected data of the substantially unbounded dimension of the stored data being mapped to different parts of the helical path, wherein the periodic intervals extend between ends of the helical path and a central part of the helical path axially tapers as a three-dimensional spiral path toward at least one of the ends to effectively describe a corresponding conical envelope; and
- a user interface operative to receive instructions relative the graphical representation, the graphic control system being operative to manipulate the graphical representation based on instructions received by the user interface.

7. The tool of claim 6, further comprising a mapping system associated with the data storage system, the mapping system being operative to map selected stored data to a corresponding part of the graphical representation, the graphic control system converting the selected data to the corresponding part of the graphical representation.

8. The tool of claim 6, wherein the graphic control system is further operative to manipulate the graphical representation to visualize the graphical representation as seen along a user-selected viewpoint in response to corresponding activation of the user interface.

9. An interactive program guide, comprising:
- a graphical user interface operative to visualize stored program data as an interactive three-dimensional graphical representation thereof having a generally helical path with spaced apart ends, the stored program data comprises programming data indicative of at least one of audio and visual programming, the graphical representation forms part of an interactive electronic program guide operative to visualize the programming data, and the generally helical path tapering as a three dimensional spiral path near at least one of the ends to effectively describe a conical envelope; and
- at least one selectable user interface element along the helical path, the user interface element being associated with corresponding program data and operative to, when selected, effect further visualization of the corresponding program data.

10. The program guide of claim 9, wherein time is graphically represented as extending between the spaced apart ends of the helical path.

11. The program guide of claim 10, further comprising a plurality of selectable user interface elements along the helical path, wherein each selectable interval characterizes programming characteristics for a different time period.

12. The program guide of claim 9, wherein the helical path visually correlates the stored program data relative a substantially unbounded dimension of the stored program data.

13. The program guide of claim 12, wherein the at least one substantially unbounded dimension includes time.

14. The program guide claim 13, wherein at least one end portion of the helical path tapers as a three-dimensional spiral path axially in the direction of the at least one end, thereby representing an unbounded characteristic of the stored program data.

15. A system to facilitate visualization of data, comprising:
- means for graphically representing stored data as an interactive three-dimensional generally helical path having spaced apart ends in which different parts of the stored data are mapped to different parts of the graphical representation, at least one of the spaced apart ends substantially describing a conical envelope, the stored data comprises programming data indicative of at least one of audio and visual programming, the graphical representation provides part of an interactive electronic program guide operative to visualize the programming data;
- selection means for selecting part of the graphical representation; and
- means for modifying the graphical representation based on part of the graphical representation being selected.

16. The system of claim 15, further comprising means for mapping a substantially unbounded dimension of the stored data along the helical path.

17. The system of claim 16, wherein the substantially unbounded dimension corresponds to time, the helical path having associated periodic intervals to which the stored data is mapped.

18. A method to visualize stored data, comprising:
- accessing multi-dimensional data comprising programming data indicative of at least one of audio and visual programming;
- generating a visualization based on at least some of the accessed data, the visualization comprising a representation of a three-dimensional generally helical path having spaced apart ends, at least one spaced apart end effectually circumscribing a conical envelope, the generated visualization providing part of an interactive electronic program guide operative to visualize the programming data;
- mapping different parts of the accessed data to corresponding parts of the helical path; and
- changing the visualization in response an interactive part of the visualization being selected.

19. The method of claim 18, wherein the mapping further comprises mapping a substantially unbounded dimension of the stored data along the generally helical path.

20. The method of claim 19, wherein the substantially unbounded dimension corresponds to time, the helical path having associated periodic intervals with which corresponding of stored data are associated.

* * * * *